United States Patent
Shuman

(10) Patent No.: US 10,375,562 B2
(45) Date of Patent: Aug. 6, 2019

(54) EXCHANGING A RECOMMENDATION OF A SET OF D2D RAT TYPES FOR A PROXIMITY-BASED SERVICE AND SEARCHING FOR A BINARY CODE THAT IDENTIFIES A PROXIMITY-BASED SERVICE ON AT LEAST ONE D2D RAT TYPE IN ACCORDANCE WITH A D2D RAT SEQUENCE

(71) Applicant: QUALCOMM Incorporated, San Diego, CA (US)

(72) Inventor: Mohammed Ataur Rahman Shuman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 15/253,424

(22) Filed: Aug. 31, 2016

(65) Prior Publication Data
US 2018/0063691 A1 Mar. 1, 2018

(51) Int. Cl.
*H04W 8/00* (2009.01)
*H04W 76/14* (2018.01)
(Continued)

(52) U.S. Cl.
CPC ........... *H04W 8/005* (2013.01); *H04W 4/023* (2013.01); *H04W 4/80* (2018.02); *H04W 76/14* (2018.02)

(58) Field of Classification Search
CPC ..... H04W 8/005; H04W 76/14; H04W 28/18; H04W 4/80; H04W 4/023
See application file for complete search history.

(56) References Cited

U.S. PATENT DOCUMENTS 9,813,510 B1 * 11/2017 Nickels ................. G06N 7/005
2013/0217333 A1 8/2013 Sprigg et al.
(Continued)

FOREIGN PATENT DOCUMENTS

WO 2014152853 A2 9/2014

OTHER PUBLICATIONS

International Search Report and Written Opinion—PCT/US2017/040255—ISA/EPO—Jan. 25, 2018.
(Continued)

*Primary Examiner* — Joseph E Dean, Jr.
(74) *Attorney, Agent, or Firm* — MG-IP Law, P.C.

(57) ABSTRACT

In an embodiment, a ProSe server recommends D2D RAT type(s) to a publisher based on subscriber D2D RAT capability statistics that characterize D2D RAT type capabilities of subscribers that subscribe to a proximity-based service in a location region. In an example, the publisher may then advertise the proximity-based service on the recommended D2D RAT type(s). In another embodiment, the ProSe server recommends D2D RAT type(s) to a subscriber based on publisher D2D RAT capability statistics that characterize D2D RAT type(s) used by publishers to advertise a proximity-based service in a location region. In an example, the subscriber may then search for the proximity-based service on the recommended D2D RAT type(s) and/or on one or more other D2D RAT type(s). In another embodiment, a subscriber searches for a binary code identifying a proximity-based service in accordance with a D2D RAT sequence.

23 Claims, 15 Drawing Sheets

(51) Int. Cl.
*H04W 4/02* (2018.01)
*H04W 4/80* (2018.01)

(56) References Cited

U.S. PATENT DOCUMENTS

| | | |
|---|---|---|
| 2013/0287012 A1* | 10/2013 | Pragada ................ H04W 76/25 |
| | | 370/338 |
| 2013/0288668 A1 | 10/2013 | Pragada et al. |
| 2014/0213186 A1* | 7/2014 | Gage ...................... H04W 4/21 |
| | | 455/41.2 |
| 2014/0273850 A1 | 9/2014 | Park et al. |
| 2015/0110052 A1 | 4/2015 | Venkatachalam et al. |
| 2015/0142986 A1 | 5/2015 | Reznik et al. |
| 2015/0282108 A1 | 10/2015 | Kiss |
| 2016/0088583 A1 | 3/2016 | Stephens et al. |

OTHER PUBLICATIONS

Partial International Search Report—PCT/US2017/040255—ISA/EPO—Oct. 19, 2017.

* cited by examiner

EXCHANGING A RECOMMENDATION OF A SET OF D2D RAT TYPES FOR A PROXIMITY-BASED SERVICE AND SEARCHING FOR A BINARY CODE THAT IDENTIFIES A PROXIMITY-BASED SERVICE ON AT LEAST ONE D2D RAT TYPE IN ACCORDANCE WITH A D2D RAT SEQUENCE

BACKGROUND

1. Field of the Disclosure

Embodiments relate to exchanging a recommendation of a set of device-to-device (D2D) radio access technology (RAT) types for a proximity-based service and searching for a binary code that identifies a proximity-based service on at least one D2D RAT type in accordance with a device-to-device radio access technology sequence

2. Description of the Related Art

Wireless communications systems have developed through various generations, including a first-generation analog wireless phone service (1G), a second-generation (2G) digital wireless phone service (including interim 2.5 G and 2.75 G networks), a third-generation (3G) high speed data, Internet-capable wireless service and a fourth-generation (4G) service (e.g., Long-Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

In addition to supporting network connectivity to one or more of the above-noted cellular radio access technologies (RATs), communications devices may also support one or more device-to-device (D2D) communications protocols by which the communications devices can communicate with each other directly. Similar to cellular communications systems, there are different types of D2D RATs over which devices can communicate with each other, including but not limited to LTE Direct (LTE-D), Wi-Fi Direct, Wi-Fi Neighborhood Area Network (NAN) or Wi-Fi Aware, Bluetooth (BLE) and so on.

While 3GPP Release 12 has added support for Proximity Services (ProSe) to LTE, proximity-based services may also be supported by on other D2D RAT types (e.g., Wi-Fi Direct, Wi-Fi NAN or BLE). User equipments (UEs) that host a proximity-based service (or publishers) and UEs that are proximate to these publishers and are configured to subscribe to a proximity-based service (or subscribers) may support some or all of these different D2D RAT types.

SUMMARY

An embodiment is directed to a method of operating a proximity services (ProSe) server, including determining that a publisher at a given location is equipped with transmission capability on multiple device-to-device (D2D) radio access technology (RAT) types desires to offer a given proximity-based service, determining subscriber D2D RAT capability statistics that characterize D2D RAT type capabilities of a set of subscribers that subscribe to the given proximity-based service in a location region associated with the given location, selecting at least one D2D RAT type based at least in part on the subscriber D2D RAT capability statistics and transmitting, to the publisher, a recommendation that the publisher advertise the given proximity-based service over the selected at least one D2D RAT type.

Another embodiment is directed to a method of operating a proximity services (ProSe) server, including determining that a subscriber at a given location is equipped with reception capability on multiple D2D RAT types subscribes to a given proximity-based service, determining publisher D2D RAT capability statistics that characterize D2D RAT types used by a set of publishers to advertise the given proximity-based service in a location region associated with the given location, selecting at least one D2D RAT type based at least in part upon the publisher D2D RAT capability statistics and transmitting, to the subscriber, a recommendation that the subscriber search for a publisher advertising the given proximity-based service over the selected at least one D2D RAT type.

Another embodiment is directed to a method of operating a subscriber that subscribes to a given proximity-based service, including obtaining a binary code that is used by a set of publishers to identify the given proximity-based service on multiple D2D RAT types that are supported by the subscriber, determining a D2D RAT sequence that defines at least a first set of D2D RAT types to be searched, the first set of D2D RAT types including less than all of the multiple D2D RAT types that are supported by the subscriber and searching for the binary code on the first set of D2D RAT types in accordance with the D2D RAT sequence.

Another embodiment is directed to a method of operating a UE equipped with transmission and/or reception capability on multiple D2D RAT radio access technology (RAT) types, including registering by the UE, with a ProSe server in association with a given proximity-based service, reporting a given location of the UE to the ProSe server and receiving, from the ProSe server based on D2D RAT statistics that characterize D2D RAT types used by a set of other UEs in a location region associated with the given location, a recommendation for the UE to exchange data for the given proximity-based service with one or more other UEs over at least one D2D RAT type.

BRIEF DESCRIPTION OF THE DRAWINGS

A more complete appreciation of embodiments of the disclosure will be readily obtained as the same becomes better understood by reference to the following detailed description when considered in connection with the accompanying drawings which are presented solely for illustration and not limitation of the disclosure, and in which.

DETAILED DESCRIPTION

Figure 1:
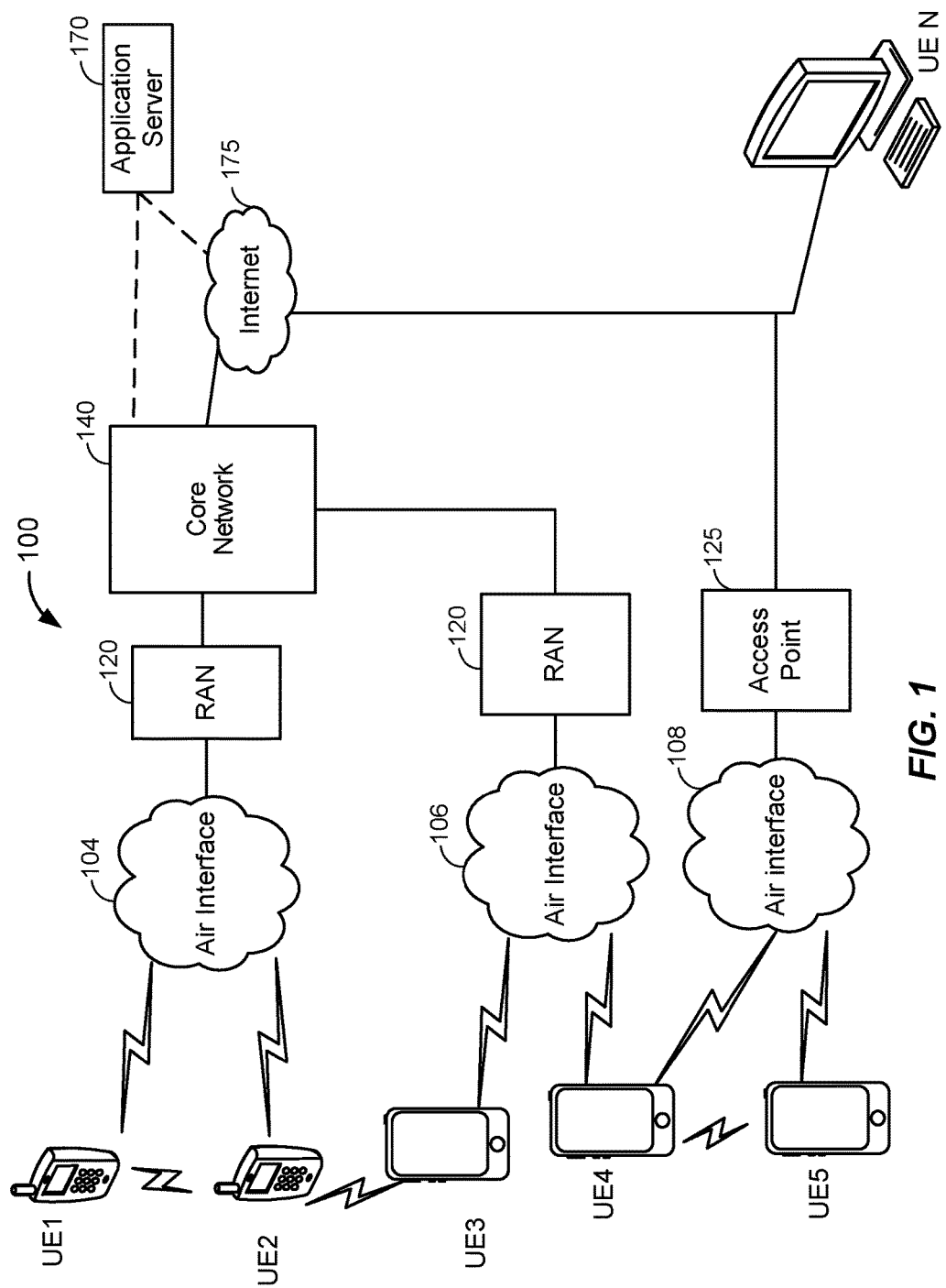
FIG. 1 illustrates a high-level system architecture of a wireless communications system in accordance with an embodiment of the disclosure.

Aspects of the disclosure are disclosed in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a wired access network and/or a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile device", a "mobile terminal", a "mobile station" and variations thereof. In an embodiment, UEs can communicate with a core network via the RAN, and through the core network the UEs can be connected with external networks such as the Internet. Of course, other mechanisms of connecting to the core network and/or the Internet are also possible for the UEs, such as over wired access networks, Wi-Fi networks (e.g., based on IEEE 802.11, etc.) and so on. UEs can be embodied by any of a number of types of devices including but not limited to cellular telephones, personal digital assistants (PDAs), pagers, laptop computers, desktop computers, PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the disclosure. The wireless communications system 100 contains UEs 1 . . . N. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., a RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 may include a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 may include configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. Further, some or all of UEs 1 . . . N may be device-to-device (D2D)-capable, or capable of direct wireless communication with other UEs without network mediation via one or more D2D radio access technologies (RATs), including but not limited to LTE Direct (LTE-D), Wi-Fi Direct, Wi-Fi Neighborhood Area Network (NAN) or Wi-Fi Aware, Bluetooth (BLE) and so on.

The Internet 175, in some examples includes a number of routing agents and processing agents (not shown in FIG. 1 for the sake of convenience). In FIG. 1, UE N is shown as connecting to the Internet 175 directly (i.e., separate from the core network 140, such as over an Ethernet connection of Wi-Fi or 802.11-based network). The Internet 175 can thereby function to bridge packet-switched data communications between UEs 1 . . . N via the core network 140. Also shown in FIG. 1 is the access point 125 that is separate from the RAN 120. The access point 125 may be connected to the Internet 175 independent of the core network 140 (e.g., via an optical communications system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a Wi-Fi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. As will be described below in more detail, the server 170 is configured to support one or more communication services (e.g., Voice-over-Internet Protocol (VoIP) sessions, Push-to-Talk (PTT) sessions, group communication sessions, social networking services, etc.) for UEs that can connect to the server 170 via the core network 140 and/or the Internet 175, and/or to provide content (e.g., web page downloads) to the UEs.

Figure 2:
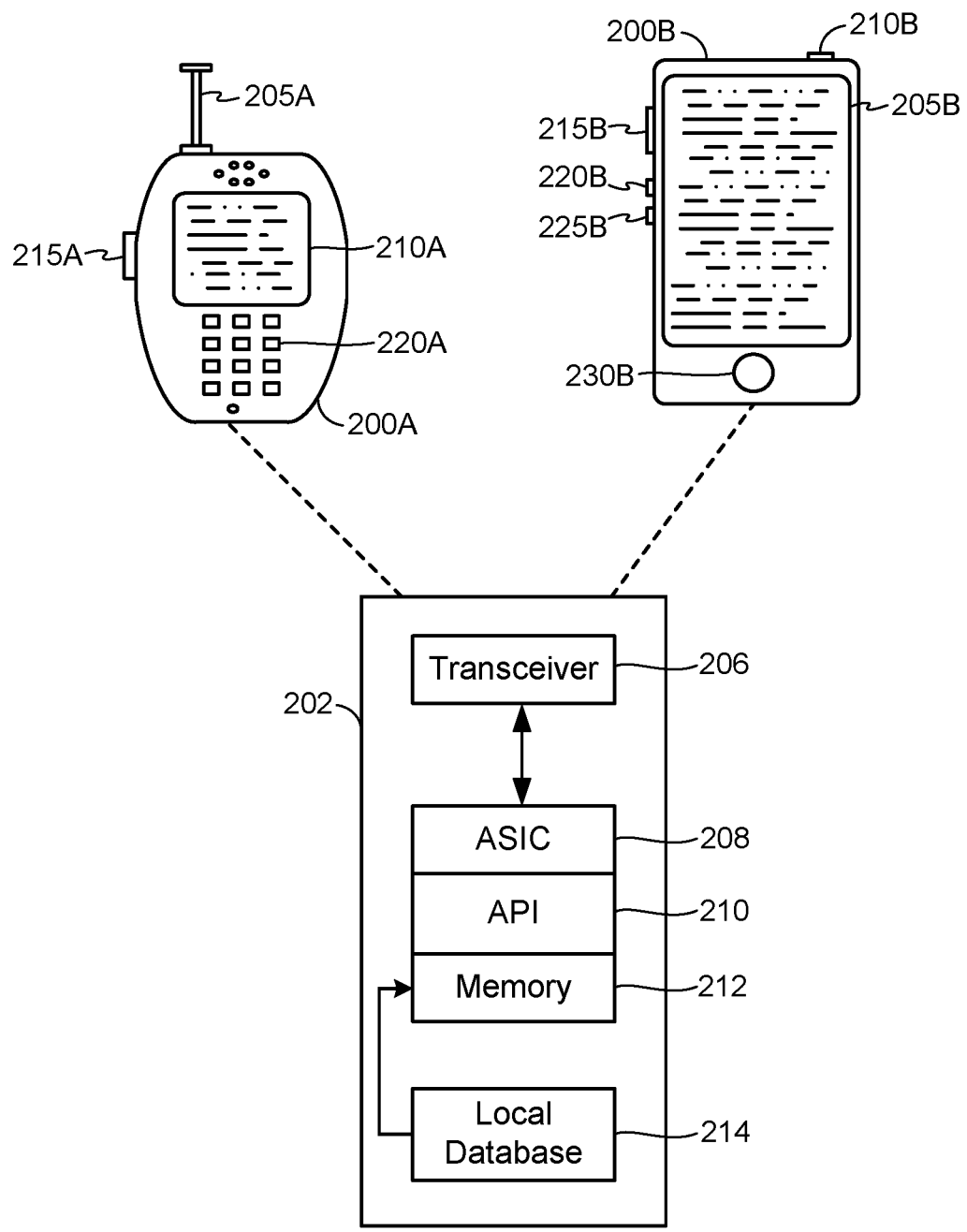
FIG. 2 illustrates examples of user equipments (UEs) in accordance with embodiments of the disclosure.

FIG. 2 illustrates examples of UEs (i.e., client devices) in accordance with embodiments of the disclosure. Referring to FIG. 2, UE 200A is illustrated as a calling telephone and UE 200B is illustrated as a touchscreen device (e.g., a smart phone, a tablet computer, etc.). As shown in FIG. 2, an external casing of UE 200A is configured with an antenna 205A, display 210A, at least one button 215A (e.g., a PTT button, a power button, a volume control button, etc.) and a keypad 220A among other components, as is known in the art. Also, an external casing of UE 200B is configured with a touchscreen display 205B, peripheral buttons 210B, 215B, 220B and 225B (e.g., a power control button, a volume or vibrate control button, an airplane mode toggle button, etc.), and at least one front-panel button 230B (e.g., a Home button, etc.), among other components, as is known in the art. While not shown explicitly as part of UE 200B, UE 200B can include one or more external antennas and/or one or more integrated antennas that are built into the external casing of UE 200B, including but not limited to Wi-Fi antennas, cellular antennas, satellite position system (SPS) antennas (e.g., global positioning system (GPS) antennas), and so on.

While internal components of UEs such as UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., application server 170, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in a memory 212 of the wireless device. The memory 212 can be comprised of read-only or random-access memory (RAM and ROM), EEPROM, flash cards, or any memory common to computer platforms. The platform 202 also can include a local database 214 that can store applications not actively used in the memory 212, as well as other data. The local database 214 is typically a flash memory cell, but can be any secondary storage device as known in the art, such as magnetic media, EEPROM, optical media, tape, soft or hard disk, or the like.

Accordingly, an embodiment of the disclosure can include a UE (e.g., UE 200A, 200B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, the ASIC 208, the memory 212, the API 210 and the local database 214 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the disclosure is not limited to the illustrated features or arrangement.

The wireless communications between UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the disclosure and are merely to aid in the description of aspects of embodiments of the disclosure.

Figure 3:
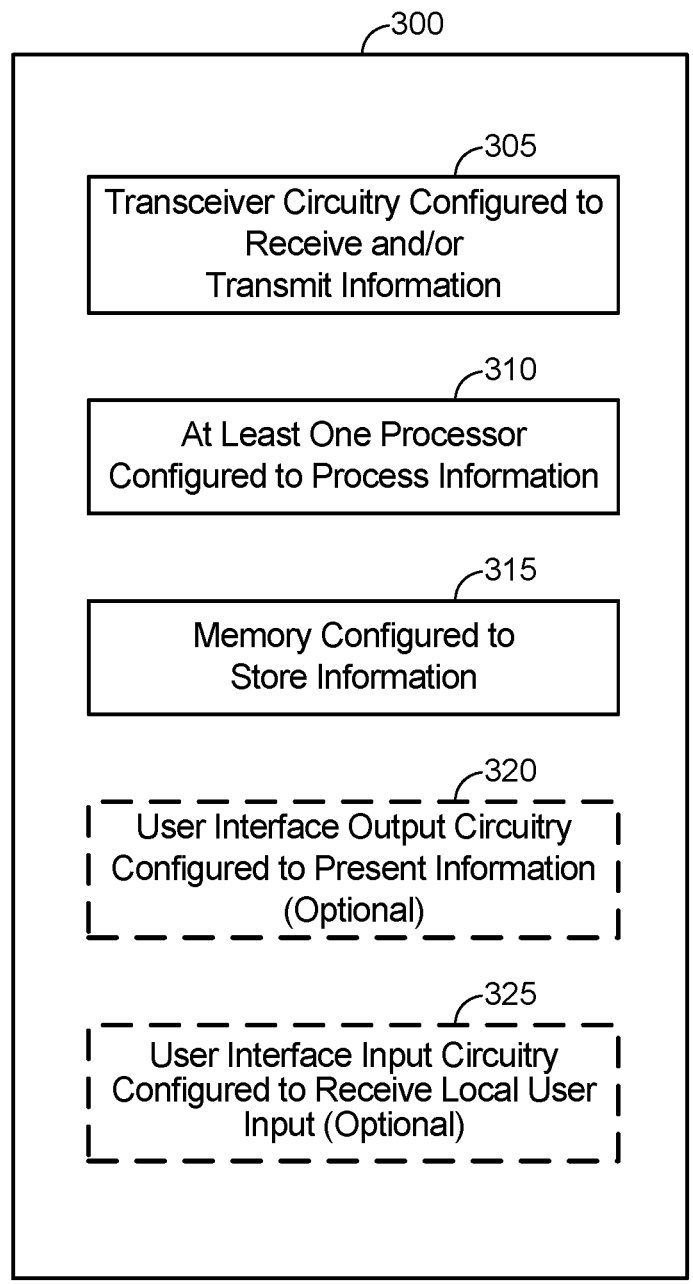
FIG. 3 illustrates a communications device that includes structural components in accordance with an embodiment of the disclosure.

FIG. 3 illustrates a communications device 300 that includes structural components in accordance with an embodiment of the disclosure. The communications device 300 can correspond to any of the above-noted communications devices, including but not limited to UEs 1 . . . N, UEs 200A and 200B, any component included in the RAN 120 such as base stations, access points or eNodeBs, any component of the core network 140, any component coupled to the Internet 175 (e.g., the application server 170), and so on. Thus, communications device 300 can correspond to any electronic device that is configured to communicate with (or facilitate communication with) one or more other entities over the wireless communications systems 100 of FIG. 1.

Referring to FIG. 3, the communications device 300 includes transceiver circuitry configured to receive and/or transmit information 305. In an example, if the communications device 300 corresponds to a wireless communications device (e.g., UE 200A or UE 200B), the transceiver circuitry configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the transceiver circuitry configured to receive and/or transmit information 305 can correspond to a wired communications interface (e.g., a serial connection, a USB or Firewire connection, an Ethernet connection through which the Internet 175 can be accessed, etc.). Thus, if the communications device 300 corresponds to some type of network-based server (e.g., the application server 170), the transceiver circuitry configured to receive and/or transmit information 305 can correspond to an Ethernet card, in an example, that connects the network-based server to other communication entities via an Ethernet protocol. In a further example, the transceiver circuitry configured to receive and/or transmit information 305 can include sensory or measurement hardware by which the communications device 300 can monitor its local environment (e.g., an accelerometer, a temperature sensor, a light sensor, an antenna for monitoring local RF signals, etc.). The transceiver circuitry configured to receive and/or transmit information 305 can also include software that, when executed, permits the associated hardware of the transceiver circuitry configured to receive and/or transmit information 305 to perform its reception and/or transmission function(s). However, the transceiver circuitry configured to receive and/or transmit information 305 does not correspond to software alone, and the transceiver circuitry configured to receive and/or transmit information 305 relies at least in part upon structural hardware to achieve its functionality. Moreover, the transceiver circuitry configured to receive and/or transmit information 305 may be implicated by language other than "receive" and "transmit", so long as the underlying function corresponds to a receive or transmit function. For an example, functions such as obtaining, acquiring, retrieving, measuring, etc., may be performed by the transceiver circuitry configured to receive and/or transmit information 305 in certain contexts as being specific types of receive functions. In another example, functions such as sending, delivering, conveying, forwarding, etc., may be performed by the transceiver circuitry configured to receive and/or transmit information 305 in certain contexts as being specific types of transmit functions. Other functions that correspond to other types of receive and/or transmit functions may also be performed by the transceiver circuitry configured to receive and/or transmit information 305.

Referring to FIG. 3, the communications device 300 further includes at least one processor configured to process information 310. Example implementations of the type of processing that can be performed by the at least one processor configured to process information 310 includes but is not limited to performing determinations, establishing connections, making selections between different information options, performing evaluations related to data, interacting with sensors coupled to the communications device 300 to perform measurement operations, converting information from one format to another (e.g., between different protocols such as .wmv to .avi, etc.), and so on. For example, the at least one processor configured to process information 310 can include a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the at least one processor configured to process information 310 may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The at least one processor configured to process information 310 can also include software that, when executed, permits the associated hardware of the at least one processor configured to process information 310 to perform its processing function(s). However, the at least one processor configured to process information 310 does not correspond to software alone, and the at least one processor configured to process information 310 relies at least in part upon structural hardware to achieve its functionality. Moreover, the at least one processor configured to process information 310 may be implicated by language other than "processing", so long as the underlying function corresponds to a processing function. For an example, functions such as evaluating, determining, calculating, identifying, etc., may be performed by the at least one processor configured to process information 310 in certain contexts as being specific types of processing functions. Other functions that correspond to other types of processing functions may also be performed by the at least one processor configured to process information 310.

Referring to FIG. 3, the communications device 300 further includes memory configured to store information 315. In an example, the memory configured to store information 315 can include at least a non-transitory memory and associated hardware (e.g., a memory controller, etc.). For example, the non-transitory memory included in the memory configured to store information 315 can correspond to RAM, flash memory, ROM, erasable programmable ROM (EPROM), EEPROM, registers, hard disk, a removable disk, a CD-ROM, or any other form of storage medium known in the art. The memory configured to store information 315 can also include software that, when executed, permits the associated hardware of the memory configured to store information 315 to perform its storage function(s). However, the memory configured to store information 315 does not correspond to software alone, and the memory configured to store information 315 relies at least in part upon structural hardware to achieve its functionality. Moreover, the memory configured to store information 315 may be implicated by language other than "storing", so long as the underlying function corresponds to a storing function. For an example, functions such as caching, maintaining, etc., may be performed by the memory configured to store information 315 in certain contexts as being specific types of storing functions. Other functions that correspond to other types of storing functions may also be performed by the memory configured to store information 315.

Referring to FIG. 3, the communications device 300 further optionally includes user interface output circuitry configured to present information 320. In an example, the user interface output circuitry configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communications device 300. For example, if the communications device 300 corresponds to the UE 200A and/or UE 200B as shown in FIG. 2, the user interface output circuitry configured to present information 320 can include the display 226. In a further example, the user interface output circuitry configured to present information 320 can be omitted for certain communications devices, such as network communications devices that do not have a local user (e.g., network switches or routers, remote servers, etc.). The user interface output circuitry configured to present information 320 can also include software that, when executed, permits the associated hardware of the user interface output circuitry configured to present information 320 to perform its presentation function(s). However, the user interface output circuitry configured to present information 320 does not correspond to software alone, and the user interface output circuitry configured to present information 320 relies at least in part upon structural hardware to achieve its functionality. Moreover, the user interface output circuitry configured to present information 320 may be implicated by language other than "presenting", so long as the underlying function corresponds to a presenting function. For an example, functions such as displaying, outputting, prompting, conveying, etc., may be performed by the user interface output circuitry configured to present information 320 in certain contexts as being specific types of presenting functions. Other functions that correspond to other types of storing functions may also be performed by the user interface output circuitry configured to present information 320.

Referring to FIG. 3, the communications device 300 further optionally includes user interface input circuitry configured to receive local user input 325. In an example, the user interface input circuitry configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communications device 300. For example, if the communications device 300 corresponds to UE 200A or UE 200B as shown in FIG. 2, the user interface input circuitry configured to receive local user input 325 can include the buttons 220A, the display 210A (if a touchscreen), etc. In a further example, the user interface input circuitry configured to receive local user input 325 can be omitted for certain communications devices, such as network communications devices that do not have a local user (e.g., network switches or routers, remote servers, etc.). The user interface input circuitry configured to receive local user input 325 can also include software that, when executed, permits the associated hardware of the user interface input circuitry configured to receive local user input 325 to perform its input reception function(s). However, the user interface input circuitry configured to receive local user input 325 does not correspond to software alone, and the user interface input circuitry configured to receive local user input 325 relies at least in part upon structural hardware to achieve its functionality. Moreover, the user interface input circuitry configured to receive local user input 325 may be implicated by language other than "receiving local user input", so long as the underlying function corresponds to a receiving local user function. For an example, functions such as obtaining, receiving, collecting, etc., may be performed by the user interface input circuitry configured to receive local user input 325 in certain contexts as being specific types of receiving local user functions. Other functions that correspond to other types of receiving local user input functions may also be performed by the user interface input circuitry configured to receive local user input 325.

Referring to FIG. 3, while the configured structural components of 305 through 325 are shown as separate or distinct blocks in FIG. 3 that are implicitly coupled to each other via an associated communication bus (not shown expressly), it will be appreciated that the hardware and/or software by which the respective configured structural components of 305 through 325 performs their respective functionality can overlap in part. For example, any software used to facilitate the functionality of the configured structural components of 305 through 325 can be stored in the non-transitory memory associated with the memory configured to store information 315, such that the configured structural components of 305 through 325 each performs their respective functionality (i.e., in this case, software execution) based in part upon the operation of software stored by the memory configured to store information 315. Likewise, hardware that is directly associated with one of the configured structural components of 305 through 325 can be borrowed or used by other of the configured structural components of 305 through 325 from time to time. For example, the at least one processor configured to process information 310 can format data into an appropriate format before being transmitted by the transceiver circuitry configured to receive and/or transmit information 305, such that the transceiver circuitry configured to receive and/or transmit information 305 performs its functionality (i.e., in this case, transmission of data) based in part upon the operation of structural hardware associated with the at least one processor configured to process information 310.

Figure 4:
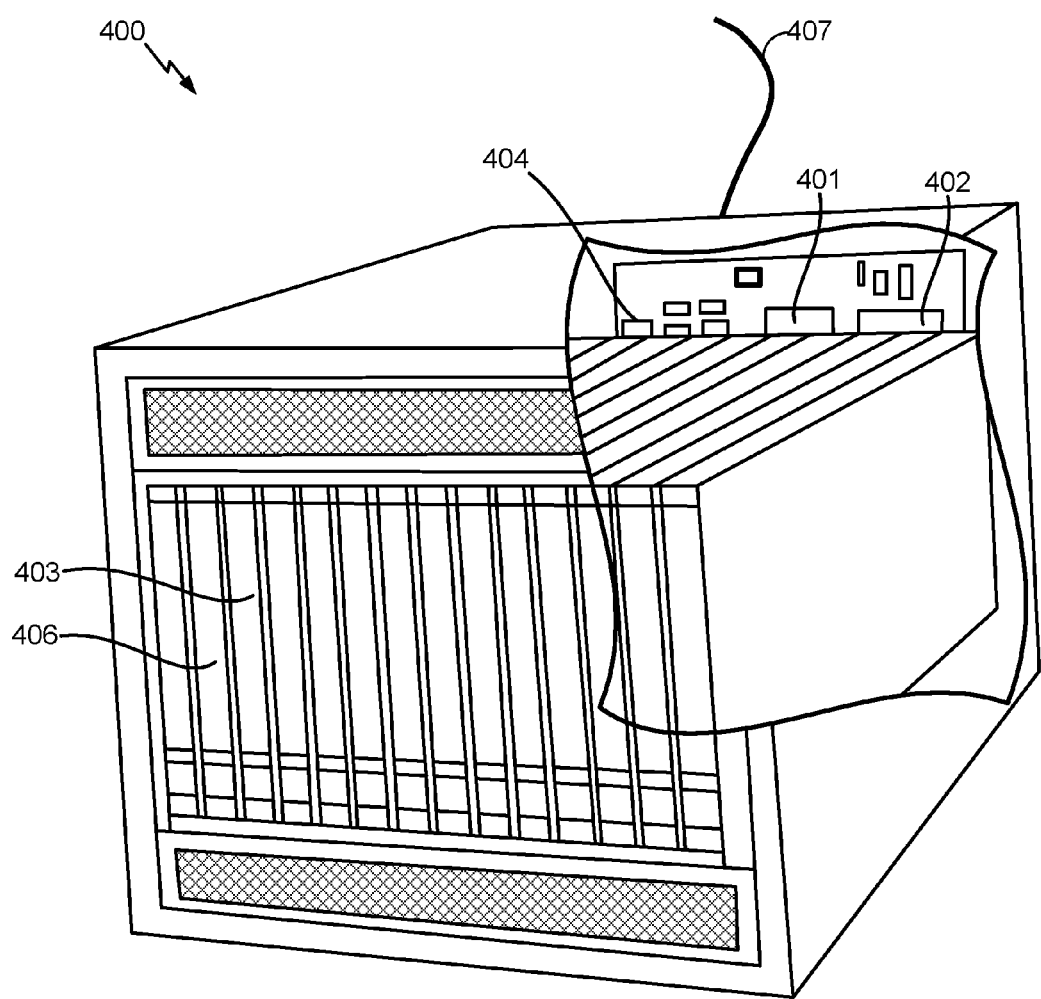
FIG. 4 illustrates a server in accordance with an embodiment of the disclosure.

The various embodiments may be implemented on any of a variety of commercially available server devices, such as server 400 illustrated in FIG. 4. In an example, the server 400 may correspond to one example configuration of the application server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communications device 300, whereby the transceiver circuitry configured to transmit and/or receive information 305 corresponds to the network access points 404 used by the server 400 to communicate with the network 407, the at least one processor configured to process information 310 corresponds to the processor 401, and the memory configuration to store information 315 corresponds to any combination of the volatile memory 402, the disk drive 403 and/or the disc drive 406. The optional user interface output circuitry configured to present information 320 and the optional user interface input circuitry configured to receive local user input 325 are not shown explicitly in FIG. 4 and may or may not be included therein. Thus, FIG. 4 helps to demonstrate that the communications device 300 may be implemented as a server, in addition to a UE as in FIG. 2.

Figure 5:
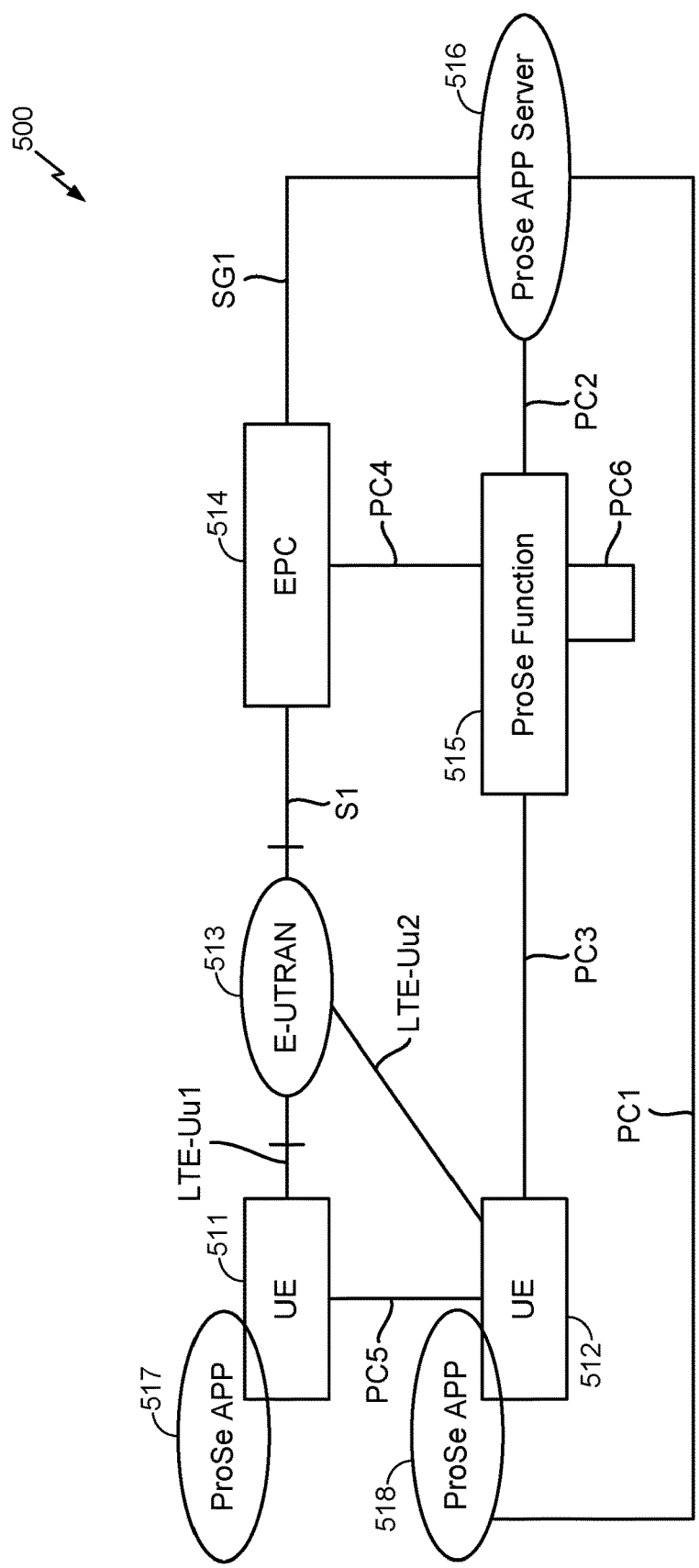
FIG. 5 is a schematic view showing an example of an LTE-specific Proximity Services (ProSe) network architecture in accordance with an example embodiment of the disclosure.

FIG. 5 is a schematic view showing an example of an LTE-specific Proximity Services (ProSe) network architecture 500 in accordance with an example embodiment of the disclosure. As shown in FIG. 5, the ProSe network architecture 500 includes UE 511, UE 512, an E-UTRAN 513, an Evolved Packet Core (EPC) or core network 514, a ProSe Function 515, a ProSe application server 516, a ProSe client application 517, and a ProSe client application 518.

UEs 511 and 512 can communicate through a PC5, UE 511 and the E-UTRAN 513 communicate through LTE-Uu1, and UE 512 can communicate with the E-UTRAN 513 and the ProSe Function 515 through LTE-Uu2 and a PC3, respectively. The EPC 514 and the ProSe Function 515 can communicate through a PC4, the ProSe application server 516 can communicate with the EPC 514 and the ProSe client application 518 through a SG1 and a PC1, respectively, and the ProSe Function 515 can communicate by itself through a PC6.

Two different modes for ProSe Direct Communication one-to-one are supported:

Network independent direct communication: This mode of operation for ProSe Direct Communication does not require any network assistance to authorize the connection and communication is performed by using only functionality and information local to the UE. This mode is applicable only to pre-authorized ProSe-enabled Public Safety UEs, regardless of whether the UEs are served by E-UTRAN or not.

Network authorized direct communication: This mode of operation for ProSe Direct Communication requires network assistance and may also be applicable when only one UE is "served by E-UTRAN" for Public safety UEs. For non-Public Safety UEs both UEs must be "served by E-UTRAN".

The interfaces PC1-PC6 depicted in FIG. 5 operate as follows:

PC1: This is the reference point between the ProSe client application 518 in the UE 512 and in the ProSe application server 516. It is used to define application level requirements.

PC2: This is the reference point between the ProSe application server 516 and the ProSe Function 515. PC2 is used to define the interaction between the ProSe application server 516 and ProSe functionality provided by the 3GPP EPS via the ProSe Function 515. One example of use of it may be for application data updates for a ProSe database in the ProSe Function 515. Another example of use of it may be data for use by the ProSe application server 516 in interworking between 3GPP functionality and application data, e.g. name translation.

PC3: This is the reference point between the UE 512 and the ProSe Function 515. PC3 is used to define the interaction between the UE 512 and the ProSe Function 515. An example of use of it is for configuration for ProSe discovery and communication.

PC4: This is the reference point between the EPC 514 and the ProSe Function 515. PC4 is used to define the interaction between the EPC 514 and the ProSe Function 515. Possible use cases of it may be when setting up a one-to-one communication path between UEs or when validating proximity-based services (authorization) for session management or mobility management in real time.

PC5: This is the reference point between the UE 511 to the UE 512 used for control and user plane for discovery and communication, for relay and one-to-one communication (between UEs directly and between UEs over LTE-Uu).

PC6: This reference point may be used for functions such as ProSe Discovery between users which are subscribed to different public land mobile networks (PLMNs).

While FIG. 5 illustrates an LTE-specific ProSe network architecture example where the PC5 connection between UEs 511 and 512 may correspond to the D2D RAT type of LTE-D, proximity-based services may be supported on other types of D2D RAT types (e.g., Wi-Fi Direct, Wi-Fi Neighborhood Area Network (NAN) or Wi-Fi Aware, Bluetooth (BLE) and so on). UEs that host a proximity-based service (or publishers) and UEs that are proximate to these publishers and are configured to subscribe to a proximity-based service (or subscribers) may support some or all of these different D2D RAT types.

In an example, a publisher that wants to reach as many proximate subscribers as possible may advertise its proximity-based service(s) on each publisher-supported D2D RAT type, and a subscriber that wants to detect as many proximity-based services as possible may monitor each subscriber-supported D2D RAT type to detect proximity-based service advertisements from proximate publishers. However, the approach whereby publishers and subscribers use all available D2D RAT types for advertising and/or discovery of proximity-based services can be fairly power consuming for both the publishers and the subscribers. Alternatively, the publishers and subscribers can simply select one particular D2D RAT type to use for proximity-based services, but this can reduce the number of subscribers reached by the publishers as well as the number of proximity-based services discovered by the subscribers (e.g., if publisher 1 only uses LTE-D to advertise a proximity-based service and subscriber 1 only uses Wi-Fi NAN to scan for proximity-based service, subscriber 1 will not discover publisher 1's proximity-based service).

Embodiments of the disclosure are thereby directed to publishers and/or subscribers selecting a set of D2D RAT types upon which to advertise proximity-based services and/or search for proximity-based services based on a recommendation from a ProSe server. As will be described below in more detail, the D2D RAT type recommendation from the ProSe server may be based upon current or historical location-based publisher-related and/or subscriber-related D2D RAT capability statistics.

Figure 6:
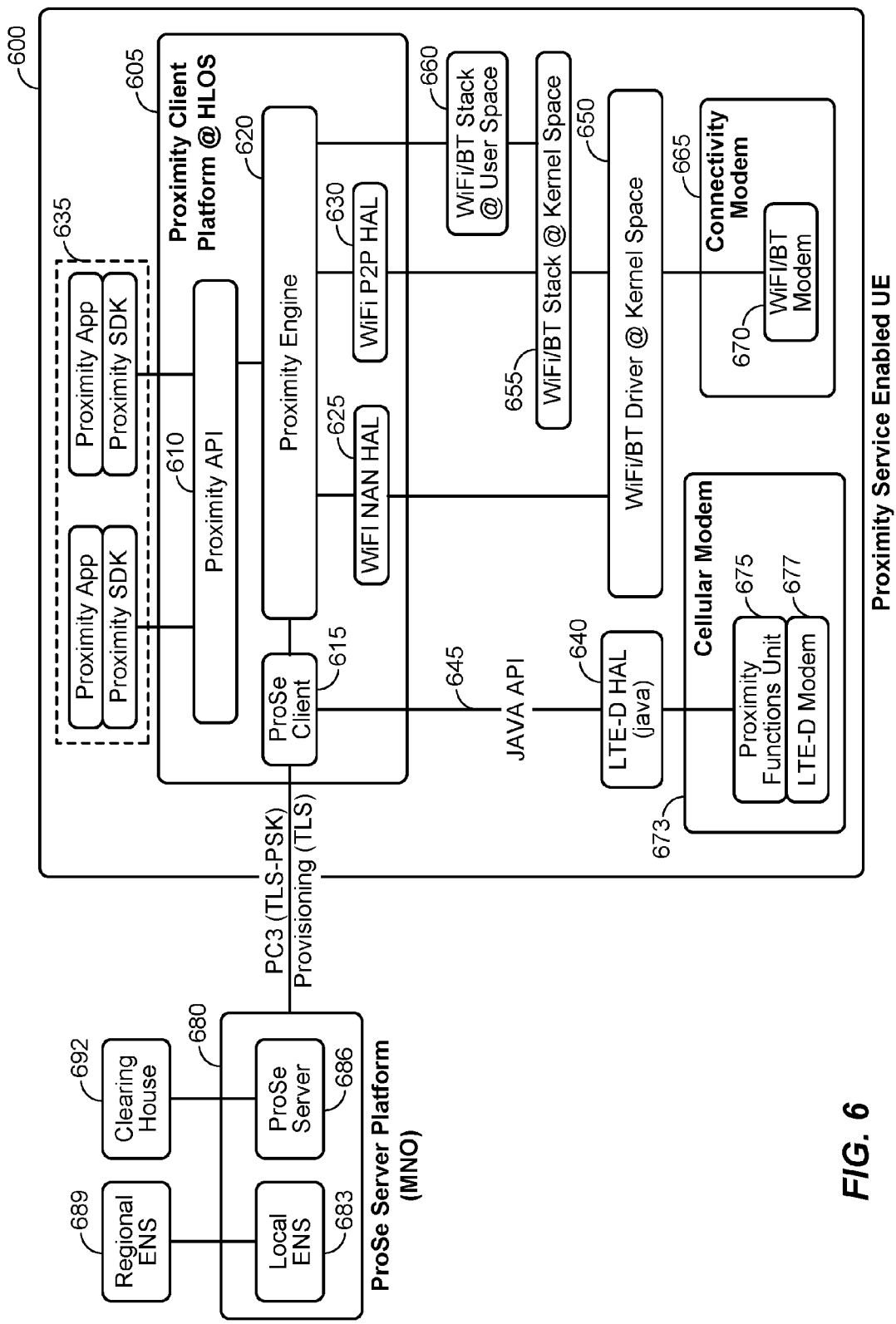
FIG. 6 illustrates a UE configured to support multiple D2D RAT types in communication with a ProSe server platform in accordance with an embodiment of the disclosure.

FIG. 6 illustrates a UE 600 configured to support multiple D2D RAT types in communication with a ProSe server platform 680 (e.g., part of a Mobile Network Operator (MNO) such as Verizon) in accordance with an embodiment of the disclosure. In an example, the UE 600 may correspond to UE 511 or UE 512 from FIG. 5, and the ProSe server platform 680 may correspond in part to the ProSe application server 516 from FIG. 5. While UE 600 is specifically related to the D2D RAT types of Wi-Fi NAN, LTE-D and Bluetooth, it will be appreciated that other embodiments can be provisioned with different configurations for supporting alternate D2D RAT types.

Referring to FIG. 6, UE 600 includes a proximity client platform 605 configured to execute a high-level operating system (HLOS) (e.g., Android, iOS, Windows Mobile, etc.). The proximity client platform 605 includes a proximity API 610, a ProSe client 615, a proximity engine 620, a Wi-Fi NAN hardware abstraction layer (HAL) 625 and a Wi-Fi P2P HAL 630. The proximity API 610 interfaces with a plurality of proximity applications 635 that support different proximity-based services. The ProSe client 615 interfaces with the ProSe server platform 680 via PC3 (e.g., which may use Transport Layer Security pre-shared key (TLS-PSK) for PC3 communication), with the proximity engine 620 and with a LTE-D HAL 640 via a Java API 645. The Wi-Fi NAN HAL 625 interfaces with a Wi-Fi/Bluetooth driver @ kernel space unit 650, the Wi-Fi P2P HAL 630 interfaces with a Wi-Fi/Bluetooth stack @ kernel space unit 655 that in turn interfaces with the Wi-Fi/Bluetooth driver @ kernel space unit 650, and the proximity engine 620 interfaces with a Wi-Fi/Bluetooth stack @ user space unit 660 that in turn interfaces with the Wi-Fi/Bluetooth driver @ kernel space unit 650. The Wi-Fi/Bluetooth driver @ kernel space unit 650 interfaces with a connectivity modem 665 that includes a Wi-Fi/Bluetooth modem 670. The LTE-D HAL 640 interfaces with a cellular modem 673 that includes a proximity functions unit 675 and an LTE-D modem 677.

Referring to FIG. 6, the ProSe server platform 680 includes a local Expression Name Server (ENS) 683 and a ProSe server 686 (e.g., corresponding to ProSe server 516 of FIG. 5 or application server 170 of FIG. 1). The ProSe server platform 680 is further connected to a regional ENS 689 and a clearing house 692 via backhaul connections.

LTE-D relies upon "Expressions" for both discovery of proximate peers and facilitating communication between proximate peers. Expressions at the application or service layer are referred to as "Expression Names" (e.g., ShirtSale@Gap.com, Jane@Facebook.com, etc.). Expression Names at the application layer are mapped to bit-strings at the physical layer that are referred to as "Expression Codes". In an example, each Expression Code can have a given length (e.g., 192 bits, "11001111 . . . 1011", etc.). As will be appreciated, any reference to a particular Expression can be used to refer to the Expression's associated Expression Name, Expression Code or both, depending upon the context. Expressions can be either Private or Public. Public Expressions are made public and can be identified by any application, whereby Private Expressions are targeted for specific audiences. Expressions can be configured to identify and characterize LTE-D groups, or alternatively can be configured to identify and characterize individual LTE-D devices.

Public Expressions can be externally provisioned by a ProSe server (e.g., ProSe server 516 of FIG. 5, ProSe server 686 of FIG. 6, etc.), in which case the Public Expressions are referred to as public managed expressions which can be provisioned at the LTE-D device via out-of-band signaling. Public Expressions can alternatively be managed locally by the client application on the LTE-D device itself, in which case the Public Expressions are referred to as unmanaged expressions.

Discovery in LTE-D operates in a synchronous manner based on parameters that are configured by the LTE network itself. For example, frequency division duplexing (FDD) and/or time division duplexing (TDD) may be assigned by a serving eNode B via a Session Information Block (SIB). The serving eNode B can also configure an interval at which LTE-D devices are to announce themselves (e.g., every 20 seconds, etc.) via transmission of a Service Discovery (or P2P Discovery) message. For example, for a 10 MHz FDD system, the eNode B can allocate 44 Physical Uplink Shared Channel (PUSCH) radio bearers (RBs) to be used for discovery in accordance with a discovery period that occurs every 20 seconds and includes 64 sub-frames, such that the number of direct discovery resources (DRIDs) is 44×64=2816.

For example, assume that each LTE-D device periodically transmits an individual P2P discovery message (or "I_P2PDM") at the 20 second interval. Each I_P2PDM individually identifies the LTE-D device that transmits the I_P2PDM. For example, in LTE-D, the I_P2PDM can include the Private or Public Expression for the associated LTE-D device. One or more LTE-D devices that belong to a particular LTE-D group may also be assigned the task of periodically transmitting a group P2P discovery message (or "G_P2PDM") on a periodic basis, which may be the same or different from the interval at which the I_P2PDMs are transmitted. In LTE-D, the G_P2PDM can include the Private or Public Expression for the associated LTE-D group itself, as opposed to the I_P2PDM which carried the Private or Public Expression for an individual LTE-D device. In an example, less than all of the LTE-D group members may be asked to transmit the G_P2PDM to reduce interference and improve battery life in scenarios where a high number of proximate LTE-D group members are present.

Figure 7A:
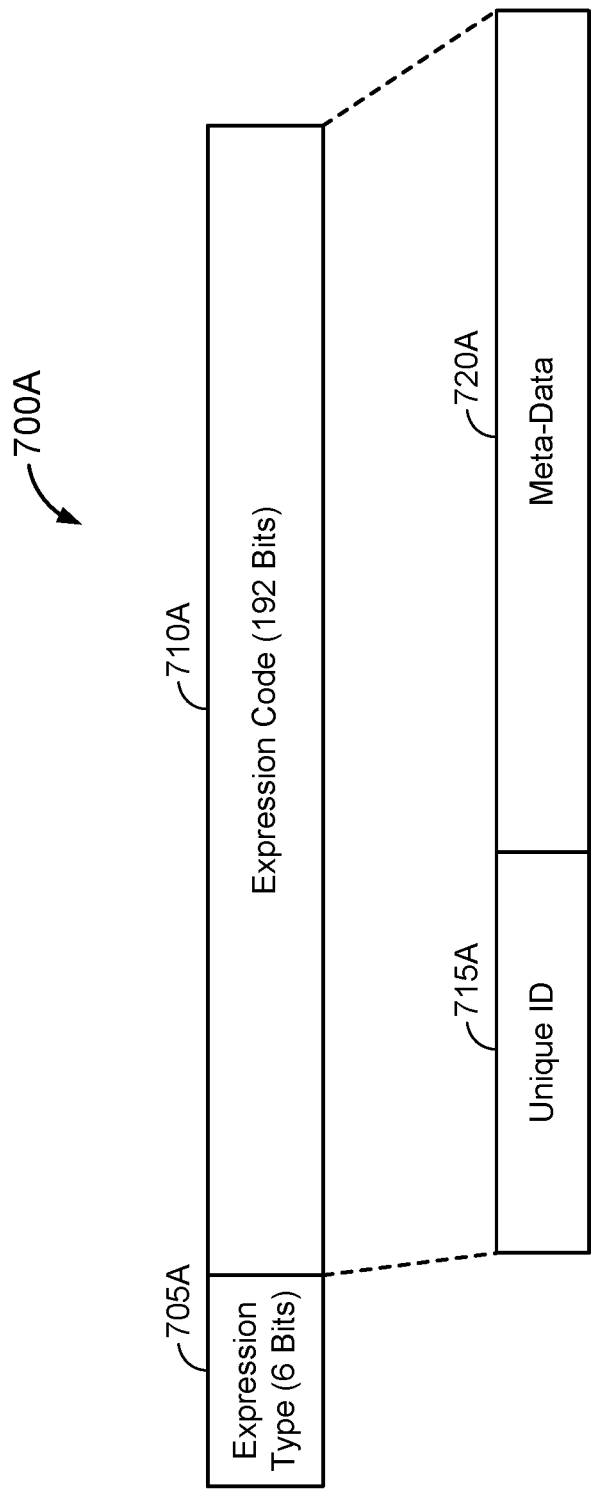
FIG. 7A illustrates an individual discovery message for LTE-D in accordance with an embodiment of the disclosure.

FIG. 7A illustrates an I_P2PDM 700A for LTE-D in accordance with an embodiment of the disclosure. Referring to FIG. 7A, the I_P2PDM 700A includes a 6-bit Expression Type Field 705A, and a 192-bit Expression Code Field 710A. The 192-bit Expression Code Field 710A includes a Unique Identifier for a particular P2P group member, 715A and one or more "metadata" fields, 720A. The metadata fields 720A can include various types of data, such as an application or service identifier (e.g., PTT, etc.), presence information (e.g., "Busy", "Available for Voice Communication", "Available for Text Communication, etc.), and so on. Other potential metadata fields that can be populated within the one or more metadata fields 720A include an operator domain mapping field (e.g., Sprint, Verizon, etc.), and so on.

Figure 7B:
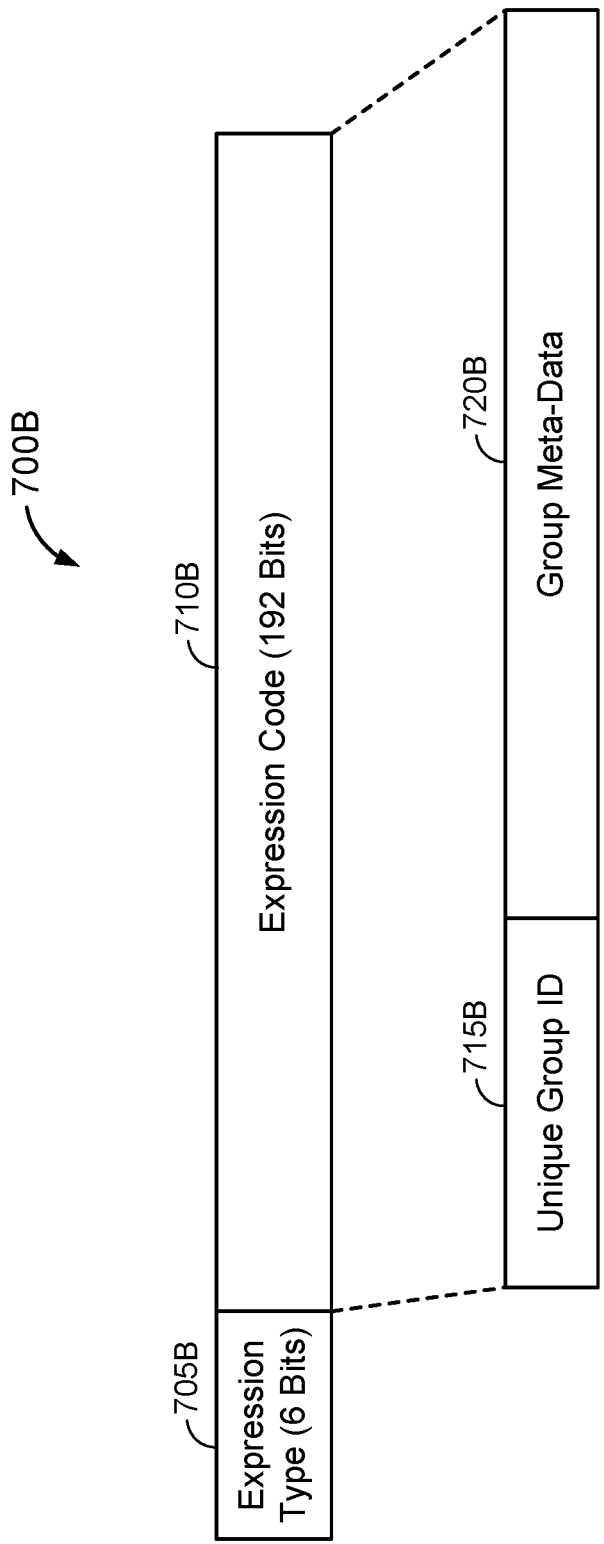
FIG. 7B illustrates a group discovery message for LTE-D in accordance with an embodiment of the disclosure.

FIG. 7B illustrates a G_P2PDM 700B for LTE-D in accordance with an embodiment of the disclosure. Referring to FIG. 7B, the G_P2PDM 700B includes a 6-bit Expression Type Field 705B, and a 192-bit Expression Code Field 710B. The 192-bit Expression Code Field 710B includes a unique group ID field that identifies a particular LTE-D group (e.g., unique within a particular operator domain, and not necessarily globally unique, etc.), 715B, and one or more group "metadata" fields, 720B. The metadata fields 720B can include various types of data, such as an application or service identifier (e.g., PTT, etc.), individual or group-specific presence information, etc. Other potential metadata fields that can be populated within the one or more metadata fields 720B include an operator domain mapping field (e.g., Sprint, Verizon, etc.), a group type (e.g., a closed group, a chatroom or public group, etc.).

Expression Code Fields in LTE-D can include a code or bitstring (e.g., in a metadata field) used by publishers to advertise one or more available proximity-based services. The same or different codes assigned by the ProSe server to advertise proximity-based services in LTE-D may be used by the publisher to advertise the one or more available proximity-based services over different D2D RAT types (e.g., Wi-Fi NAN, Bluetooth, etc.). As used herein, the terminology of "binary code" is used to refer to a code or bitstring that is configured to identify a particular proximity-based service across different D2D RAT types. In an LTE-D implementation, the binary code may correspond to part to the Expression Code Field (e.g., a metadata field), although different codes can be used in other contexts. For example, if a particular publisher supports Wi-Fi Direct and Bluetooth only, then the Expression Code Field component used to identify the publisher's proximity-based service(s) LTE-D need not be used and a different type of binary code can be used to identify that publisher's proximity-based service(s).

Figure 8:
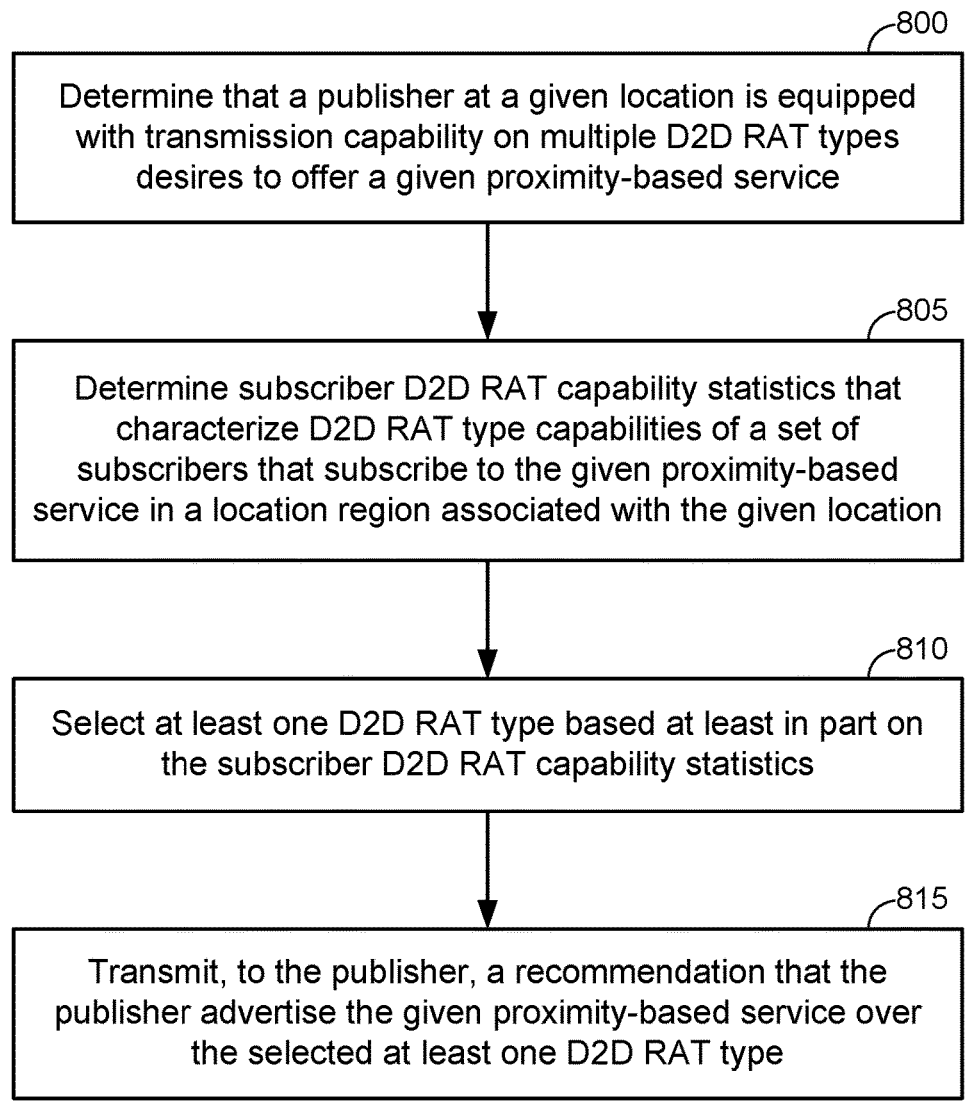
FIG. 8 illustrates a process of recommending at least one D2D RAT type to a publisher for the publisher to advertise one or more proximity-based services in accordance with an embodiment of the disclosure.

In context with LTE-D, a subscriber is said to subscribe to a proximity-based service by subscribing to an Expression that identifies that proximity-based service (e.g., the proximity-based service may be a generic indicator that the publisher sells coffee, a specific identification of a particular coffee store or chain of coffee stores, etc.). Subscribing to the Expression in this scenario means that the subscriber will monitor at least one D2D RAT type on LTE-D to detect Public and/or Private Expressions that advertise a binary code (e.g., metadata in an Expression Code Field) associated with the proximity-based service. In embodiments of the disclosure, the publisher may advertise the binary code on one or more other D2D RAT types as well (or even in place of LTE-D), and subscribers may likewise scan for the binary code on one or more other D2D RAT type (or even in place of LTE-D), FIG. 8 illustrates a process of recommending at least one D2D RAT type to a publisher for the publisher to advertise one or more proximity-based services in accordance with an embodiment of the disclosure. The process of FIG. 8 is implemented at a ProSe server, which may correspond to the application server 170 of FIG. 1, the communications device 300 of FIG. 3, the server 400 of FIG. 4, the ProSe server 516 of FIG. 5 or the ProSe server 686 of FIG. 6.

Referring to FIG. 8, at block 800, the ProSe server determines that a publisher at a given location is equipped with transmission capability on multiple D2D RAT types desires to offer a given proximity-based service. In an example, the publisher may register with the ProSe server to receive filter(s) or binary code(s) by which to advertise proximity-based service(s) offered by the respective publishers over their respective supported D2D RAT types. During the publisher registration, the publisher may indicate its D2D RAT type capabilities to the ProSe server. Either during or after the publisher registration, the publisher may indicate its location to the ProSe server along with a request to offer the given proximity-based service to facilitate the determination at block 800.

Referring to FIG. 8, at block 805, the ProSe server determines subscriber D2D RAT capability statistics that characterize D2D RAT type capabilities of a set of subscribers that subscribe to the given proximity-based service in a location region associated with the given location. In an example, the location region may correspond to a threshold distance away from the given location of the publisher, where the threshold distance can be predefined or based upon the D2D RAT types supported by the publisher. If the D2D RAT types supported by the publisher have different ranges, then the subscriber D2D RAT statistics for a particular D2D RAT type may relate to subscribers inside of an in-range portion of the location region (e.g., a subscriber inside of LTE-D range may be outside of Bluetooth range and as such not counted towards being a Bluetooth-capable subscriber in the location region even if the subscriber is Bluetooth-capable). So, for example, the subscriber D2D RAT statistics for Bluetooth may be skewed lower because only the subscribers within Bluetooth range of the publisher will contribute towards the overall Bluetooth support characteristic within the wider location region (e.g., within LTE-D range, etc.)

In an example, the ProSe server may gather the D2D RAT type capabilities of each subscriber when the subscriber registers for a filter (or binary code) that is used to identify the proximity-based service(s) to which the subscriber subscribes, and the ProSe server may then track the location of the subscriber using any well-known methodology to determine whether or not the subscriber is inside of the location region at block 805 either currently or historically (e.g., requiring the subscriber to report his/her location to the ProSe server at a given interval, etc.). Accordingly, from a master list of subscribers, the ProSe server can apply a location filter and a subscription filter to produce the subscriber D2D RAT capability statistics at block 805 which are relevant to the publisher's proximity-based service.

With respect to block 805 of FIG. 8, the set of subscribers may include current subscribers in the location region subscribed to one or more proximity-based services, historical subscribers that were previously in the location region while subscribed to the given proximity-based service that later moved outside of the location region, historical subscribers that are in the location region but un-subscribed from the given proximity-based service or became disconnected from the ProSe server, or any combination thereof. So, the subscriber D2D RAT capability statistics can be implemented as a blend of both a current or historical subscriber data relevant to the location region in terms of subscriber D2D RAT capability.

In an example, the historical data may be indicative of future trends (e.g., users return home from work after 6 PM every day which will impact the D2D RAT capabilities of the population of subscribers at that time, etc.). Alternatively, the subscriber D2D RAT capability statistics may reflect subscribers that are currently located in the location region only. Also, even if the subscriber D2D RAT capability statistics includes both current and historical data, different portions of the subscriber D2D RAT capability statistics may be used in different contexts, as will be discussed below in more detail with respect to block 810. For example, if a publisher only wants to advertise a proximity-based service for a very short amount of time, the historical data from the subscriber D2D RAT capability statistics may be ignored as irrelevant. In an alternative example, if the publisher wants to advertise a proximity-based service for a long amount of time, the historical data from the subscriber D2D RAT capability statistics becomes more relevant and may be factored into a D2D RAT type recommendation.

Referring to FIG. 8, at block 810, the ProSe server selects at least one D2D RAT type based at least in part the subscriber D2D RAT capability statistics from block 805. At block 815, the ProSe server transmits, to the publisher, a recommendation that the publisher advertise the given proximity-based service over the selected at least one D2D RAT type from block 810.

In an example, the selection of block 810 can be based on a set of publisher D2D RAT type selection rules configured at the ProSe server, as will be explained by way of example with respect to Table 1, as follows:

TABLE 1

D2D RAT Type Selection Examples for Publisher

| # | Publisher D2D RAT Capability | Subscriber D2D RAT Capability Statistics of Subscribers in Location Region that Subscribe to Publisher's Proximity-Based Service | Secondary Factors | D2D RAT Type Recommendation to Publisher |
|---|---|---|---|---|
| 1 | LTE-D, Wi-Fi NAN, Bluetooth | Current: LTE-D: 40% support; Wi-Fi NAN: 85% support; and Bluetooth; 95% support. Historical: LTE-D: 30% support; | N/A | Wi-Fi NAN, Bluetooth |

TABLE 1-continued

D2D RAT Type Selection Examples for Publisher

| # | Publisher D2D RAT Capability | Subscriber D2D RAT Capability Statistics of Subscribers in Location Region that Subscribe to Publisher's Proximity-Based Service | Secondary Factors | D2D RAT Type Recommendation to Publisher |
|---|---|---|---|---|
| 2 | LTE-D, Wi-Fi NAN | Wi-Fi NAN: 85% support; and Bluetooth: 90% support. Current: LTE-D: 70% support; and Wi-Fi NAN: 85% support. Historical: LTE-D: 80% support; and Wi-Fi NAN: 85% support. | N/A | LTE-D |
| 3 | LTE-D, Wi-Fi NAN | Current: LTE-D: 90% support; and Wi-Fi NAN: 25% support. Historical: LTE-D: 20% support; and Wi-Fi NAN: 95% support. | Publisher only plans on offering proximity-based service for short time | LTE-D |
| 4 | LTE-D, Wi-Fi NAN | Current: LTE-D: 90% support; and Wi-Fi NAN: 25% support. Historical: LTE-D: 20% support; and Wi-Fi NAN: 95% support. | Publisher plans on offering proximity-based service for long time | LTE-D, Wi-Fi NAN |

Referring to Example 1 of Table 1 (above), the subscriber support for LTE-D in the location region (e.g., a certain threshold distance away from the publisher) is fairly low, as only 40% of current subscribers in the location region that subscribe to the publisher's proximity-based service currently support LTE-D while only 30% of historical subscribers in the location region previously supported LTE-D. Hence, the ProSe server determines to recommend the D2D RAT types of Wi-Fi NAN and Bluetooth for advertisement of the publisher's proximity-based service in Example 1 in view of the higher relative subscriber support for Wi-Fi NAN and Bluetooth in the publisher's location region.

Referring to Example 2 of Table 1 (above), the publisher does not support Bluetooth so any Bluetooth-related subscriber D2D RAT capability statistics can be ignored. The current and historical subscriber population has reasonably high support rates for both LTE-D and Wi-Fi NAN. In Example 2, the ProSe server determines to recommend the D2D RAT type of LTE-D only for advertisement of the publisher's proximity-based service despite Wi-Fi NAN having slightly higher current and historical support rates based on a preference for LTE-D over Wi-Fi NAN in this particular example (e.g., due to LTE-D consuming less power than Wi-Fi NAN, etc.).

Referring to Example 3 of Table 1 (above), the publisher does not support Bluetooth so any Bluetooth-related subscriber D2D RAT capability statistics can be ignored. The current subscriber population has high LTE-D support and low Wi-Fi NAN support, while the historical subscriber population has low LTE-D support and high Wi-Fi NAN support. In Example 3, the ProSe server determines to recommend the D2D RAT type of LTE-D only for advertisement of the publisher's proximity-based service due to secondary information provided by the publisher indicating that the publisher will only be offering the proximity-based service in that location region for a short period of time (e.g., because the publisher plans to move to a different location, because the publisher is only completing a short transaction such as selling an extra movie ticket outside a ticket booth before going to see a movie, etc.). The historical subscriber support data can be ignored (or excluded as a selection factor) in this case because it is unlikely to become relevant in the timeframe where the publisher is going to be offering the proximity-based service.

Referring to Example 4 of Table 1 (above), the publisher does not support Bluetooth so any Bluetooth-related subscriber D2D RAT capability statistics can be ignored. The current subscriber population has high LTE-D support and low Wi-Fi NAN support, while the historical subscriber population has low LTE-D support and high Wi-Fi NAN support. In Example 4, the ProSe server determines to recommend the D2D RAT types of both Wi-Fi NAN and LTE-D for advertisement of the publisher's proximity-based service due to secondary information provided by the publisher indicating that the publisher will be offering the proximity-based service in that location region for a long period of time (e.g., the publisher wants to advertise a convenience store open 24 hours a day, 7 days a week, etc.). In this case, the ProSe server may recommend advertising on both D2D RAT types to take advantage of the current high LTE-D subscriber support population while expecting the Wi-Fi NAN subscriber support population to increase over time in view of the historical data. While not shown in Example 4 expressly, if the LTE-D subscriber support population drops below a threshold as suggested will eventually happen in view of the historically low LTE-D subscriber support population, the ProSe server may send a supplemental recommendation to the publisher to switch to Wi-Fi NAN only.

To summarize the examples described with respect to Table 1, the set of publisher D2D RAT type selection rules may generally seek to select D2D RAT types that will permit the publisher to interface with a higher number or percentage of subscribers relative to at least one non-selected D2D RAT type from the multiple D2D RAT types supported by the publisher.

Figure 9:
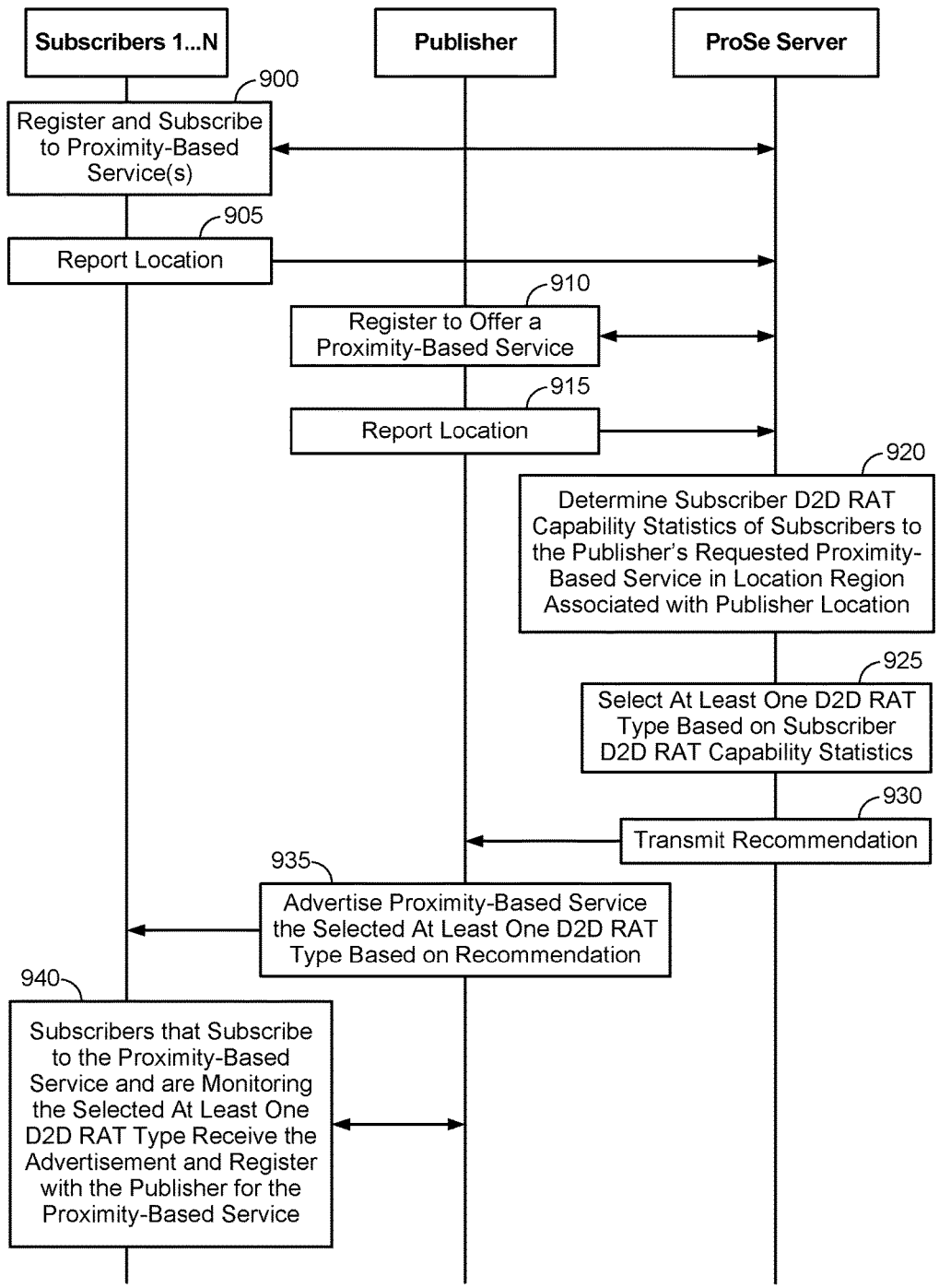
FIG. 9 illustrates an example implementation of the process of FIG. 8 in accordance with an embodiment of the disclosure.

FIG. 9 illustrates an example implementation of the process of FIG. 8 in accordance with an embodiment of the disclosure. Referring to FIG. 9, at block 900, subscribers 1 . . . N (where N is an integer greater than or equal to 1) each register and subscribe to one or more proximity-based services with the ProSe server. At block 905, subscribers 1 . . . N each report their location to the ProSe server during registration and then on an ongoing basis (e.g., in a periodic or event-triggered manner) so that the ProSe server can track the locations of subscribers 1 . . . N. At block 910, a publisher registers with the ProSe server in order to offer a proximity-based service from its current location, which is reported to the ProSe server at block 915. In association with the registration of block 910, the publisher indicates its D2D RAT type capabilities. In an example, blocks 910-915 correspond to an example implementation of block 800 of FIG. 8.

At block 920 (e.g., similar to block 805 of FIG. 8), the ProSe server determines subscriber D2D RAT capability statistics of the subscribers from among the subscribers 1 . . . N that (currently and/or historically) subscribe to the publisher's proximity-based service while inside of a location region that is associated with the publisher's location. At block 925 (e.g., similar to block 810 of FIG. 8), the ProSe server selects at least one D2D RAT type based on the subscriber D2D RAT capability statistics from block 920. At block 930 (e.g., similar to block 815 of FIG. 8), the ProSe server sends the selected at least one D2D RAT type as recommended D2D RAT type(s) to be used by the publisher to advertise the proximity-based service. Assuming the publisher accepts the ProSe server's recommendation, at block 935, the publisher advertises the proximity-based service on the selected at least one D2D RAT type(s) based on the recommendation, and at block 940, subscribers that subscribe to the proximity-based service and are monitoring the at least one D2D RAT type receive the advertisement and register (e.g., via the D2D RAT type over which the advertisement is detected) with the publisher for the proximity-based service.

Figure 10:
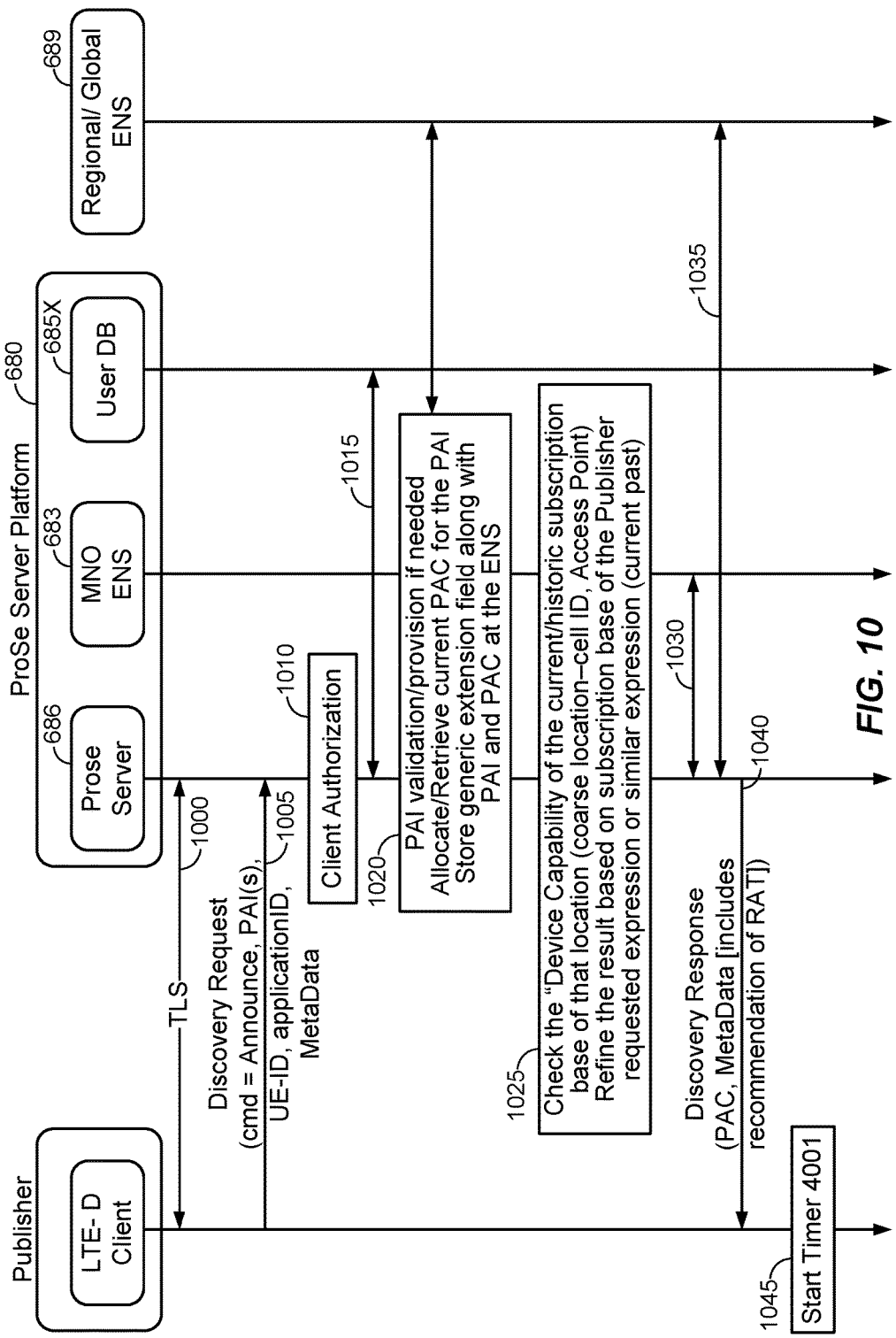
FIG. 10 illustrates an example implementation of the process of FIG. 9 with respect to the ProSe network architecture illustrated in FIG. 6 in accordance with an embodiment of the disclosure.

FIG. 10 illustrates an example implementation of the process of FIG. 9 with respect to the ProSe network architecture illustrated in FIG. 6 in accordance with an embodiment of the disclosure. At block 1000, the publisher and ProSe server 686 engage in a TLS procedure (e.g., HTTPS). At block 1005, the publisher transmits a Discovery Request (cmd=Announce,PAI(s),UE-ID,applicationID,Metadata) to the ProSe server 686. At block 1010, the ProSe server 686 determines whether authorization of the publisher for a requested proximity-based service is required, and if so, at block 1015 the ProSe server 686 authenticates the publisher with a user database 685X (not expressly illustrated in FIG. 6 but can be considered part of the ProSe server platform 680). At block 1020, the ProSe server 686 performs PAI validation/provisioning if needed, allocates/retrieves a current PAC (or binary code) for the PAI, and determines to store a generic extension field along with PAI and PAC at the local ENS 683 and the regional (or global) ENS 689. At block 1025, the ProSe server 686 checks a device capability of the current/historic subscription base (referred to above as subscriber D2D RAT capability statistics) for the publisher's location (e.g., a coarse location corresponding to a cell ID of an Access Point near the publisher, etc.) and refines the subscriber D2D RAT capability statistics based on subscription base of the publisher-requested Expression or a similar Expression (using current and/or historical subscriber capability data). At blocks 1030-1035, the generic extension field along with PAI and PAC is sent to the local ENS 683 and the regional (or global) ENS 689. At block 1040, the ProSe server 686 sends a Discovery Response (PAC, Metadata, [includes recommendation of RAT]) to the publisher. At block 1045, upon receipt of the discovery response 1040, the publisher may start a validity time (e.g., which may be renewed or extended via interaction with the ProSe server 686) during which the PAI to PAC mapping (or service to binary code mapping) is valid for the publisher to user to advertise the proximity-based service.

Figure 11:
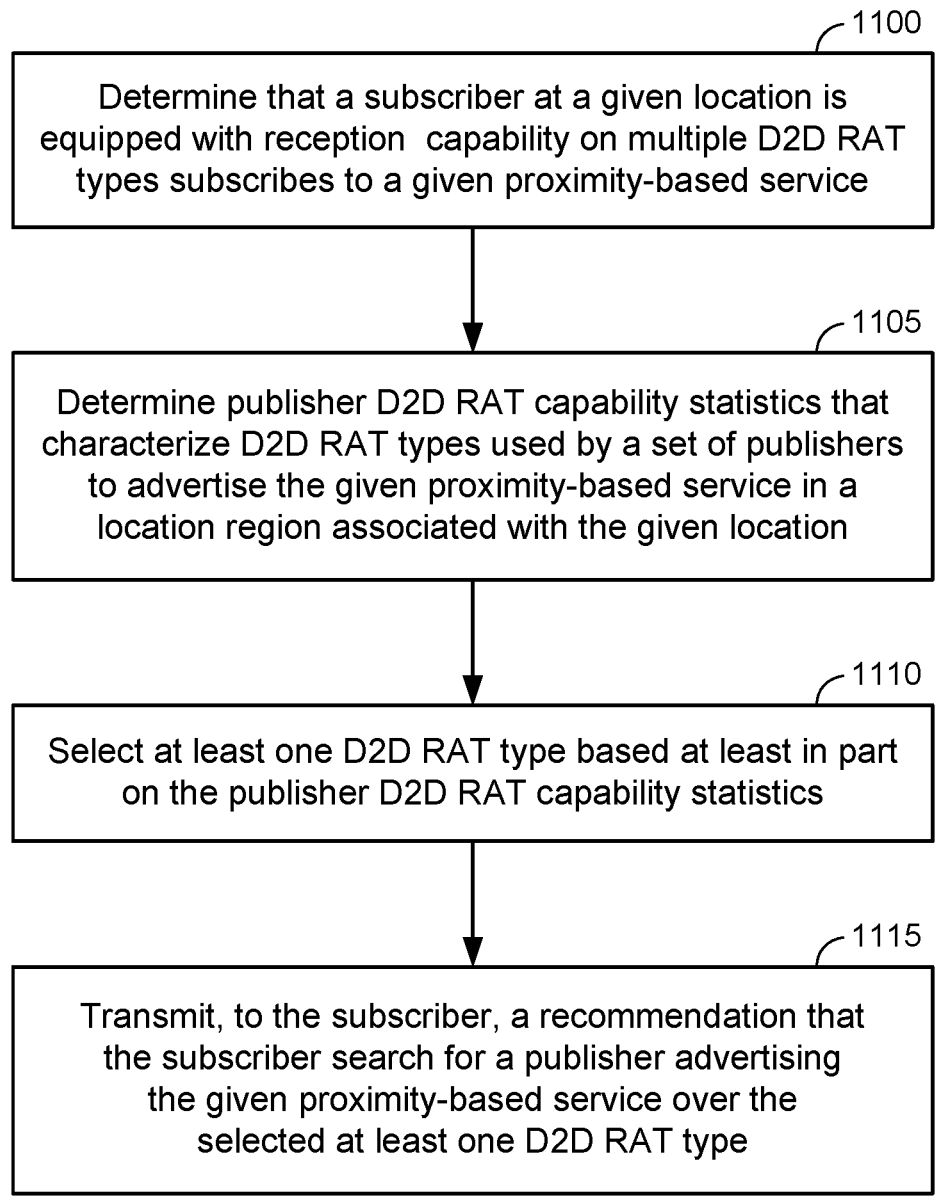
FIG. 11 illustrates a process of recommending at least one D2D RAT type to a subscriber for the subscriber to search for one or more proximity-based services in accordance with an embodiment of the disclosure.

FIG. 11 illustrates a process of recommending at least one D2D RAT type to a subscriber for the subscriber to search for one or more proximity-based services in accordance with an embodiment of the disclosure. The process of FIG. 11 is implemented at a ProSe server, which may correspond to the application server 170 of FIG. 1, the communications device 300 of FIG. 3, the server 400 of FIG. 4, the ProSe server 516 of FIG. 5 or the ProSe server 686 of FIG. 6.

Referring to FIG. 11, at block 1100, the ProSe server determines that a subscriber at a given location is equipped with reception capability on multiple D2D RAT types subscribes to a given proximity-based service. In an example, the subscriber may register with the ProSe server to receive filter(s) or binary code(s) by which to search for proximity-based service(s) offered by proximate publishers over respective D2D RAT types. During the subscriber registration, the subscriber may indicate its D2D RAT type capabilities to the ProSe server. Either during or after the subscriber registration (e.g., on an ongoing basis to facilitate location tracking of the subscriber by the ProSe server), the subscriber may indicate its location to the ProSe server along with a request to subscribe to the given proximity-based service to facilitate the determination at block 1100.

Referring to FIG. 11, at block 1105, the ProSe server determines publisher D2D RAT capability statistics that characterize D2D RAT types used by a set of publishers to advertise the given proximity-based service in a location region associated with the given location. In an example, the location region may correspond to a threshold distance away from the given location of the subscriber, where the threshold distance can be predefined or based upon the D2D RAT types supported by the subscriber. If the D2D RAT types supported by the subscriber have different ranges, then the publisher D2D RAT statistics for a particular D2D RAT type may relate to publishers inside of an in-range portion of the location region (e.g., a publisher inside of LTE-D range may be outside of Bluetooth range and as such not counted towards being a Bluetooth-capable publisher in the location region even if the publisher is advertising the given proximity-based service over Bluetooth). So, for example, the publisher D2D RAT statistics for Bluetooth may be skewed lower because only the publishers within Bluetooth range of the subscriber will contribute towards the overall Bluetooth support characteristic within the wider location region (e.g., within LTE-D range, etc.)

In an example, the ProSe server may gather the D2D RAT type capabilities of each publisher when the subscriber registers for a filter (or binary code) that is used to identify the proximity-based service(s) for which the publisher advertises, and the ProSe server may then track the location of the publisher using any well-known methodology to determine whether or not the publisher is inside of the location region at block 1105 either currently or historically (e.g., requiring the publisher to report his/her location to the ProSe server at a given interval, etc.). Accordingly, from a master list of publishers, the ProSe server can apply a location filter and a service filter to produce the publisher D2D RAT capability statistics at block 1105 which are relevant to the subscriber's proximity-based service of interest.

With respect to block 1105 of FIG. 11, the set of publishers may include current publishers in the location region that are advertising the given proximity-based service, historical publishers that were previously in the location region advertising the given proximity-based service that later moved outside of the location region, historical subscribers that are in the location region which previously advertised the given proximity-based service but later stopped or became disconnected from the ProSe server, or any combination thereof. So, the publisher D2D RAT capability statistics can be implemented as a blend of both a current or historical publisher data relevant to the location region in terms of publisher D2D RAT capability.

In an example, the historical data may be indicative of future trends (e.g., retail stores may have normal work hours such as 9 AM-5 PM and may only advertise work-related proximity-based services during these normal work hours, which will impact the D2D RAT capabilities of the population of publishers during work hours as compared to before or after normal work hours, etc.). Alternatively, the publisher D2D RAT capability statistics may reflect publishers that are currently advertising the given proximity-based service in the location region only. Also, even if the publisher D2D RAT capability statistics includes both current and historical data, different portions of the publisher D2D RAT capability statistics may be used in different contexts, as will be discussed below in more detail with respect to block 1110. For example, if publishers of the given proximity-based service are expected to be advertising the given proximity-based service for a very short amount of time, the historical data from the publisher D2D RAT capability statistics may be ignored as irrelevant. In an alternative example, if publishers of the given proximity-based service are expected to be advertising the given proximity-based service for a long amount of time, the historical data from the publisher D2D RAT capability statistics becomes more relevant and may be factored into a D2D RAT type recommendation.

Referring to FIG. 11, at block 1110, the ProSe server selects at least one D2D RAT type based at least in part upon the publisher D2D RAT capability statistics from block 1105. At block 1115, the ProSe server transmits, to the subscriber, a recommendation that the subscriber search for a publisher advertising the given proximity-based service over the selected at least one D2D RAT type from block 1110.

In an example, the selection of block 1110 can be based on a set of subscriber D2D RAT type selection rules configured at the ProSe server, as will be explained by way of example with respect to Table 2, as follows:

TABLE 2

| | | D2D RAT Type Selection Examples for Subscriber | | |
|---|---|---|---|---|
| # | Subscriber D2D RAT Capability | Publisher D2D RAT Capability Statistics of Publishers in Location Region that Advertise Subscriber's Proximity-Based Service | Secondary Factors | D2D RAT Type Recommendation to Subscriber |
| 1 | LTE-D, Wi-Fi NAN, Bluetooth | Current: LTE-D: 40% support; Wi-Fi NAN: 85% support; and Bluetooth: 95% support. Historical: LTE-D: 30% support; Wi-Fi NAN: 85% support; and Bluetooth: 90% support. | N/A | Wi-Fi NAN, Bluetooth |
| 2 | LTE-D, Wi-Fi NAN | Current: LTE-D: 70% support; and Wi-Fi NAN: 85% support. Historical: LTE-D: 80% support; and Wi-Fi NAN: 85% support. | N/A | LTE-D |
| 3 | LTE-D, Wi-Fi NAN | Current: LTE-D: 90% support; and Wi-Fi NAN: 25% support. Historical: LTE-D: 20% support; and Wi-Fi NAN: 95% support. | Publishers only expected to offer proximity-based service for short time | LTE-D |
| 4 | LTE-D, Wi-Fi NAN | Current: LTE-D: 90% support; and Wi-Fi NAN: 25% support. Historical: LTE-D: 20% support; and Wi-Fi NAN: 95% support. | Publishers only expected to offer proximity-based service for long time | LTE-D, Wi-Fi NAN |

The data in Table 2 is similar to Table 1 while the context is reversed because the D2D RAT capability statistics in Table 2 are for the publishers in proximity to the subscriber instead of subscribers in proximity to the publisher as in Table 1.

Referring to Example 1 of Table 2 (above), the publisher support for LTE-D in the location region (e.g., a certain threshold distance away from the subscriber) is fairly low, as only 40% of current publishers currently advertising the given proximity-based service in the location region use LTE-D while only 30% of historical publishers in the location region that advertised the given proximity-based service used LTE-D. Hence, the ProSe server determines to recommend the D2D RAT types of Wi-Fi NAN and Bluetooth for the subscriber to search for the given proximity-based service in Example 1 in view of the higher relative subscriber support for Wi-Fi NAN and Bluetooth in the subscriber's location region.

Referring to Example 2 of Table 2 (above), the subscriber does not support Bluetooth so any Bluetooth-related publisher D2D RAT capability statistics can be ignored. The current and historical publisher population has reasonably high advertisement rates for both LTE-D and Wi-Fi NAN. In Example 2, the ProSe server determines to recommend the D2D RAT type of LTE-D only for searching of the given proximity-based service despite Wi-Fi NAN having slightly higher current and historical support rates based on a preference for LTE-D over Wi-Fi NAN in this particular example (e.g., due to LTE-D consuming less power than Wi-Fi NAN, etc.).

Referring to Example 3 of Table 2 (above), the subscriber does not support Bluetooth so any Bluetooth-related publisher D2D RAT capability statistics can be ignored. The current publisher population has high LTE-D support and low Wi-Fi NAN support, while the historical publisher population has low LTE-D support and high Wi-Fi NAN support. In Example 3, the ProSe server determines to recommend the D2D RAT type of LTE-D only for searching of the given proximity-based service due to secondary information indicating that the publishers will only be offering the given proximity-based service in that location region for a short period of time. The historical publisher support data can be ignored (or excluded as a selection factor) in this case because it is unlikely to become relevant in the timeframe where the publishers are going to be offering the given proximity-based service.

Referring to Example 4 of Table 2 (above), the subscriber does not support Bluetooth so any Bluetooth-related publisher D2D RAT capability statistics can be ignored. The current publisher population high LTE-D support and low Wi-Fi NAN support, while the historical publisher population has low LTE-D support and high Wi-Fi NAN support. In Example 4, the ProSe server determines to recommend the D2D RAT types of both Wi-Fi NAN and LTE-D for searching of the given proximity-based service due to secondary information indicating that the publishers will be offering the given proximity-based service in that location region for a long period of time (e.g., the publishers correspond to convenience stores open 24 hours a day, 7 days a week, etc.). In this case, the ProSe server may recommend searching on both D2D RAT types to take advantage of the current high LTE-D publisher support population while expecting the Wi-Fi NAN publisher support population to increase over time in view of the historical data. While not shown in Example 4 expressly, if the LTE-D publisher support population drops below a threshold as suggested will eventually happen in view of the historically low LTE-D publisher support population, the ProSe server may send a supplemental recommendation to the subscriber to switch to Wi-Fi NAN only.

To summarize the examples described with respect to Table 2, the set of publisher D2D RAT type selection rules may generally seek to select D2D RAT types that will permit the subscriber to interface with a higher number or percentage of subscribers relative to at least one non-selected D2D RAT type from the multiple D2D RAT types supported by the subscriber.

Figure 12:
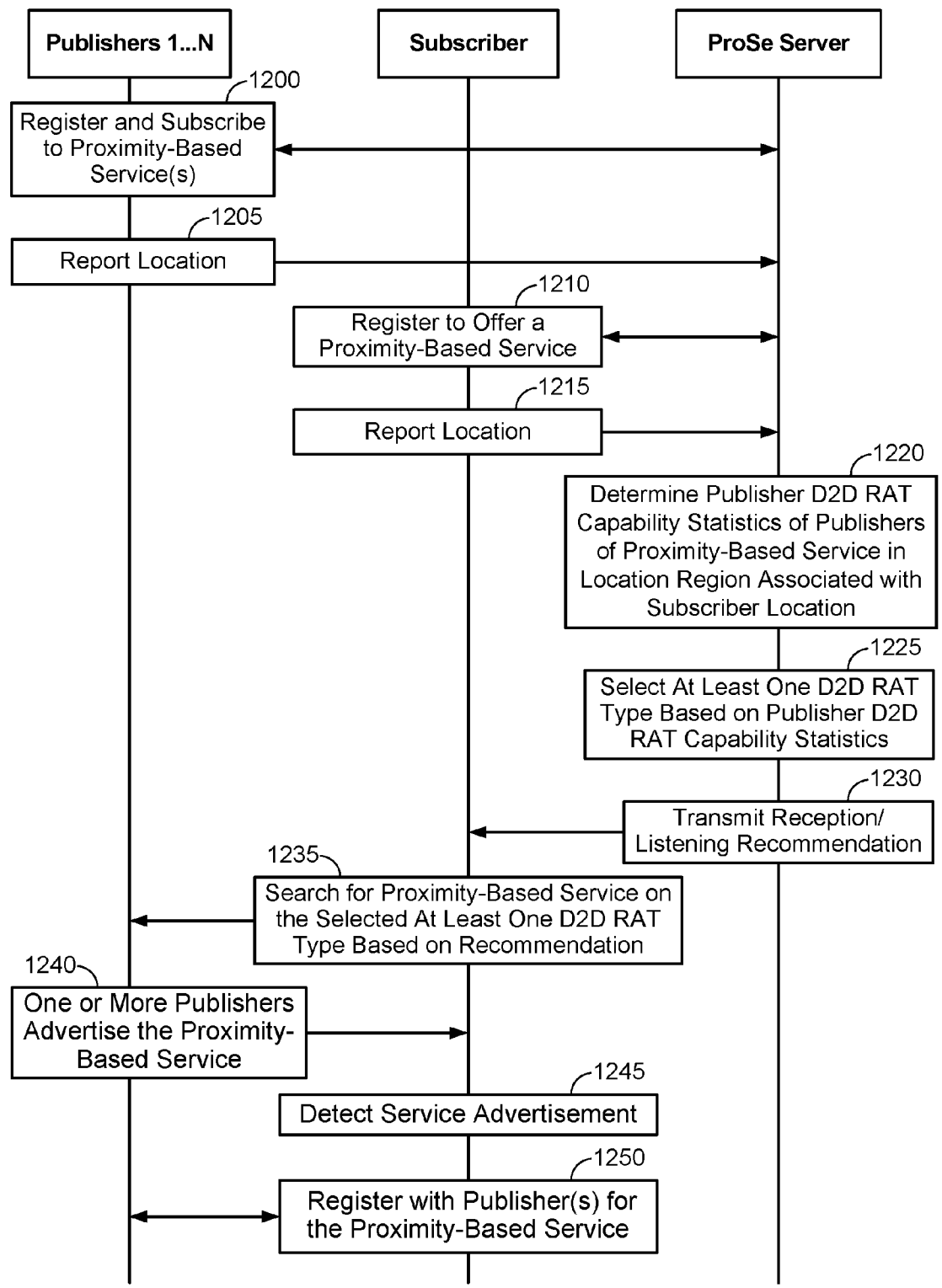
FIG. 12 illustrates an example implementation of the process of FIG. 11 in accordance with an embodiment of the disclosure.

FIG. 12 illustrates an example implementation of the process of FIG. 11 in accordance with an embodiment of the disclosure. Referring to FIG. 12, at block 1200, publishers 1 . . . N (where N is an integer greater than or equal to 1) each register to advertise one or more proximity-based services with the ProSe server. At block 1205, publishers 1 . . . N each report their location to the ProSe server during registration and then (optionally) on an ongoing basis (e.g., in a periodic or event-triggered manner) so that the ProSe server can track the locations of publishers 1 . . . N. The ongoing location reporting aspect of block 1205 is optional because some publishers may be stationary (e.g., a publisher advertising a coffee shop is probably going to stay proximate to the coffee shop, etc.). At block 1210, a subscriber registers with the ProSe server in order to subscribe to a proximity-based service, and a location of the subscriber is reported to the ProSe server at block 1215 (e.g., during registration and then on an ongoing basis in a periodic or event-triggered manner). In association with the registration of block 1210, the subscriber indicates its D2D RAT type capabilities. In an example, blocks 1210-1215 correspond to an example implementation of block 1100 of FIG. 11.

At block 1220 (e.g., similar to block 1105 of FIG. 11), the ProSe server determines publisher D2D RAT capability statistics of the publishers from among the publishers 1 . . . N that advertise (currently and/or historically) to the publisher's proximity-based service inside of a location region that is associated with the subscriber's location. At block 1225 (e.g., similar to block 1110 of FIG. 11), the ProSe server selects at least one D2D RAT type based on the publisher D2D RAT capability statistics from block 1220. At block 1230 (e.g., similar to block 1115 of FIG. 11), the ProSe server sends the selected at least one D2D RAT type as recommended D2D RAT type(s) to be used by the subscriber to search for (e.g., listen for and receive) the proximity-based service. Assuming the subscriber accepts the ProSe server's recommendation, at block 1235, the subscriber searches for the proximity-based service on the selected at least one D2D RAT type(s) based on the recommendation. At block 1240, at least one of publishers 1 . . . N advertises the proximity-based service, which is detected at the subscriber at block 1245 based on the searching from block 1235. At block 1250, the subscriber registers (e.g., via the D2D RAT type over which the advertisement is detected) with the publisher for the proximity-based service.

Figure 13:
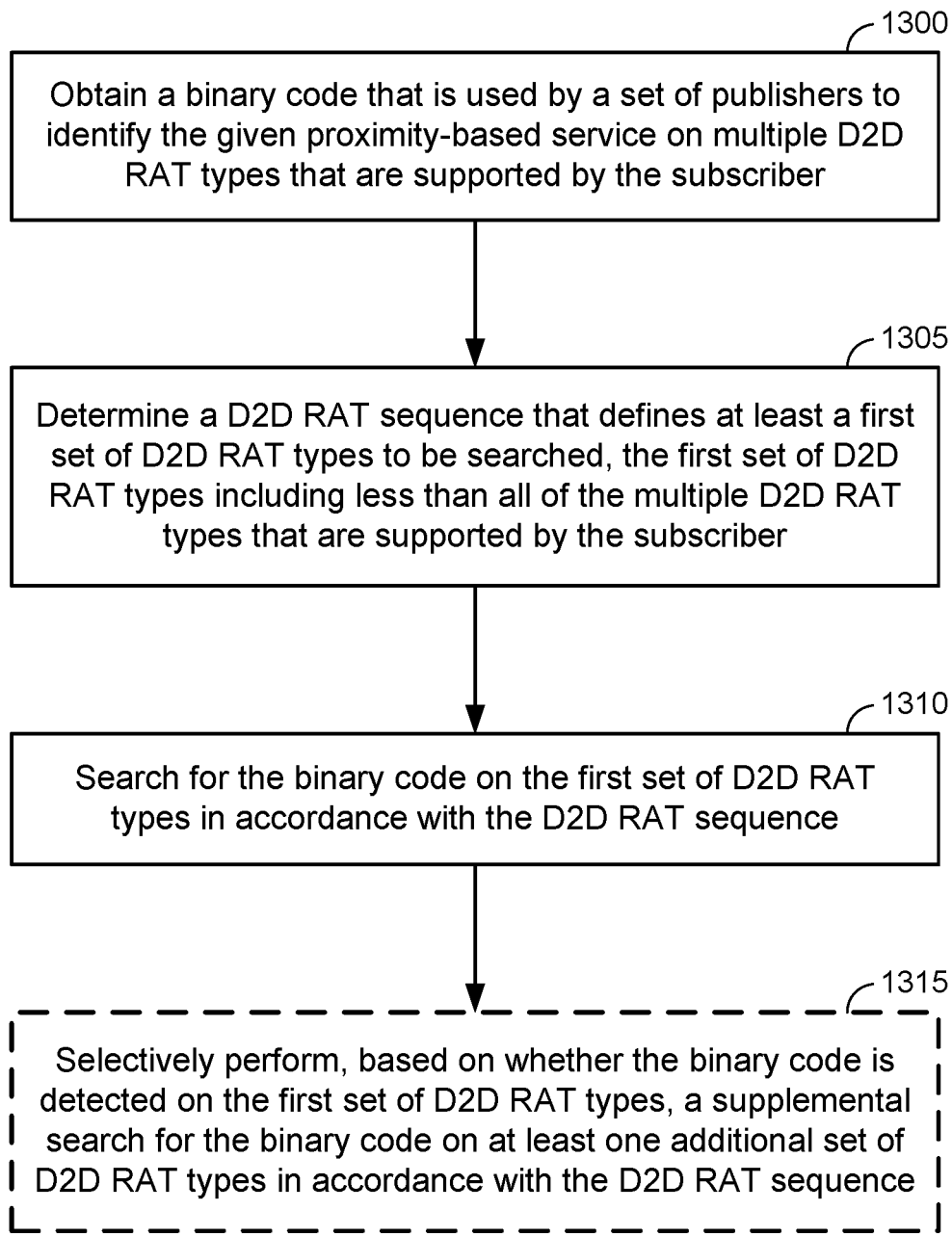
FIG. 13 relates to implementing a D2D RAT sequence by which a subscriber searches for the proximity-based service in accordance with an embodiment of the disclosure.

While FIGS. 8-12 relate to establishing one or more preferred or default D2D RAT types to use for advertising and/or searching for a proximity-based service based on publisher and/or subscriber D2D RAT capability statistics, FIG. 13 relates to implementing a D2D RAT sequence by which a subscriber searches for the proximity-based service in accordance with an embodiment of the disclosure.

Referring to FIG. 13, at block 1300, the subscriber obtains a binary code that is used by a set of publishers to identify the given proximity-based service on multiple D2D RAT types that are supported by the subscriber. In an example, the binary code may be sent to the subscriber when the subscriber subscribes to the given proximity-based service with a ProSe server. In a further example, for LTE-D, the binary code may be embedded in the metadata for Expressions transmitted by the set of publishers.

Referring to FIG. 13, at block 1305, the subscriber determines a D2D RAT sequence that defines a first set of D2D RAT types to be searched, the first set of D2D RAT types including less than all of the multiple D2D RAT types that are supported by the subscriber. At block 1305, the subscriber also optionally determines at least one additional set of D2D RAT type to be conditionally searched after the first set of D2D RAT types are searched.

The D2D RAT sequence can be determined in different ways based on different factors. For example, the process of FIG. 11 may execute, resulting in the subscriber being sent a recommendation of D2D RAT type(s). The recommended D2D RAT type(s) may be established as the first set of D2D RAT types in the D2D RAT sequence. In an alternative example, certain D2D RAT types may be deemed high-priority and may be added to the first set of D2D RAT types irrespective of whether the high-priority D2D RAT type is recommended by the ProSe server (unless the subscriber is incapable of using the high-priority D2D RAT type of course).

The D2D RAT sequence may also be defined based on secondary factors at the subscriber, such as a battery level of the subscriber (e.g., if battery level is low, skip LTE-D to save battery and search Bluetooth and Wi-Fi NAN only) and/or a priority level associated with the given proximity-based service (e.g., for a low priority "ask" or service search, simply search on LTE-D only and then give up if the binary code for the given proximity-based service is not found).

Table 3 illustrates a few D2D RAT sequence examples, as follows:

TABLE 3

D2D RAT Sequence Examples

| Subscriber D2D RAT Capability | ProSe Server Recommendation | Secondary Factors | D2D RAT Sequence |
|---|---|---|---|
| 1 LTE-D, Wi-Fi NAN, Bluetooth | Wi-Fi NAN, Bluetooth | N/A | 1. Wi-Fi NAN + Bluetooth OR 1. Wi-Fi NAN + Bluetooth 2. LTE-D |
| 2 LTE-D, Wi-Fi NAN, Bluetooth | Wi-Fi NAN, Bluetooth | Wi-Fi NAN is preferred over Bluetooth | 1. Wi-Fi NAN 2 Bluetooth OR 1. Wi-Fi NAN 2. Bluetooth 3. LTE-D |
| 3 LTE-D, Wi-Fi NAN, Bluetooth | N/A | Subscriber has Low Battery | 1. Wi-Fi NAN + Bluetooth OR 1. Wi-Fi NAN + Bluetooth, 2. LTE-D |
| 4 LTE-D, Wi-Fi NAN, Bluetooth | Wi-Fi NAN, LTE-D | Search has low priority | 1. LTE-D |

Referring to Example 1 of Table 3 (above), the ProSe server recommends Wi-Fi NAN and Bluetooth. As shown in Example 1 of Table 3, a possible D2D RAT sequence in this scenario is a parallel search for the binary code on both Wi-Fi NAN and Bluetooth without any additional search. Another possible D2D RAT sequence in this scenario is to conduct the parallel search for the binary code on both Wi-Fi NAN and Bluetooth, followed by a search for the binary code on LTE-D if the Wi-Fi NAN and Bluetooth searches for the binary code are not successful. Accordingly, Example 1 of Table 3 may consider the ProSe recommendation to determine the D2D RAT sequence.

Referring to Example 2 of Table 3 (above), the ProSe server recommends Wi-Fi NAN and Bluetooth and a secondary factor is that Wi-Fi NAN is preferred by the subscriber over Bluetooth. As shown in Example 2 of Table 3, a possible D2D RAT sequence in this scenario is a first search for the binary code on Wi-Fi NAN, followed by a second search for the binary code on Bluetooth if the Wi-Fi NAN search for the binary code is not successful. Another possible D2D RAT sequence in this scenario is a first search for the binary code on Wi-Fi NAN, followed by a second search for the binary code on Bluetooth if the Wi-Fi NAN search for the binary code is not successful, followed by a third search for the binary code on LTE-D if the Bluetooth search for the binary code is not successful. Accordingly, Example 2 of Table 3 may consider both the ProSe recommendation as well as a secondary factor to determine the D2D RAT sequence.

Referring to Example 3 of Table 3 (above), the ProSe server does not provide any D2D RAT type recommendation. A secondary factor (which in this context becomes a primary factor) is that the subscriber has a low battery status (e.g., less than 20% remaining on primary battery power source). As shown in Example 3 of Table 3, a possible D2D RAT sequence in this scenario is to exclude LTE-D to save power while implementing a parallel search for the binary code on both Wi-Fi NAN and Bluetooth. Another possible D2D RAT sequence in this scenario is to conduct the parallel search for the binary code on both Wi-Fi NAN and Bluetooth, followed by a search for the binary code on LTE-D if the Wi-Fi NAN and Bluetooth searches for the binary code are not successful. Accordingly, Example 3 of Table 3 may consider the secondary factor of subscriber battery power level to determine the D2D RAT sequence.

Referring to Example 4 of Table 3 (above), the ProSe server recommends Wi-Fi NAN and LTE-D and a secondary factor is that search has a low priority (e.g., the subscriber has a mild interest in getting a cup of coffee but does not want to expand much power to find a nearby coffee store). As shown in Example 4 of Table 3, a possible D2D RAT sequence in this scenario is to conduct a search on LTE-D only (instead of also searching Wi-Fi NAN as recommended by the ProSe server) and then simply abandon the attempt to discover the given proximity-based service if the LTE-D search is unsuccessful.

Accordingly, there are a variety of ways that the D2D RAT sequence can be determined at block 1305 using any combination of external data (e.g., recommendations from ProSe server), internal data (e.g., battery power level of subscriber, etc.) and user preferences (e.g., LTE-D preferred over Wi-Fi NAN, etc.)

Referring to FIG. 13, at block 1310, the subscriber searches for the binary code on the first set of D2D RAT types in accordance with the D2D RAT sequence. In an example, during block 1310, the subscriber may start a timer with a given expiration period. If the timer expires before the binary code is detected on any of the first set of D2D RAT types, the search of block 1310 is characterized as unsuccessful. At block 1315, the subscriber selectively performs a supplemental search for the binary code on the at least one additional set of D2D RAT types in accordance with the D2D RAT sequence based on whether the binary code is detected on the first set of D2D RAT types. For example, at block 1315, the subscriber performs the search on the at least one additional set of D2D RAT types if the binary code is not successfully detected on the first set of D2D RAT types, and the subscriber does not perform the search on the at least one additional set of D2D RAT types if the binary code is successfully detected on the first set of D2D RAT types. Block 1315 may also be optional altogether if the D2D RAT sequence does not include any additional D2D RAT types to be searched after the search of the first set of D2D RAT types (e.g., as in Example 1 of Table 3 (above) with respect to the parallel Wi-Fi NAN+Bluetooth search or Example 4 of Table 3 with respect to the LTE-D only search. In scenarios where each D2D RAT type specified in the D2D RAT has been searched, the subscriber stops the search (or abandons an attempt to discover the proximity-based service) irrespective of whether the binary code has been detected.

Block 1315 may repeat until the binary code is found on any D2D RAT type or until the D2D RAT sequence indicates that there are no additional D2D RAT types to be searched as specified in the D2D RAT sequence. To put another way, the subscriber can abandon an attempt to discover the given proximity-based service in response to detection of the binary code on any D2D RAT type or if there are no additional D2D RAT types to be searched as specified in the D2D RAT sequence.

Figure 14:
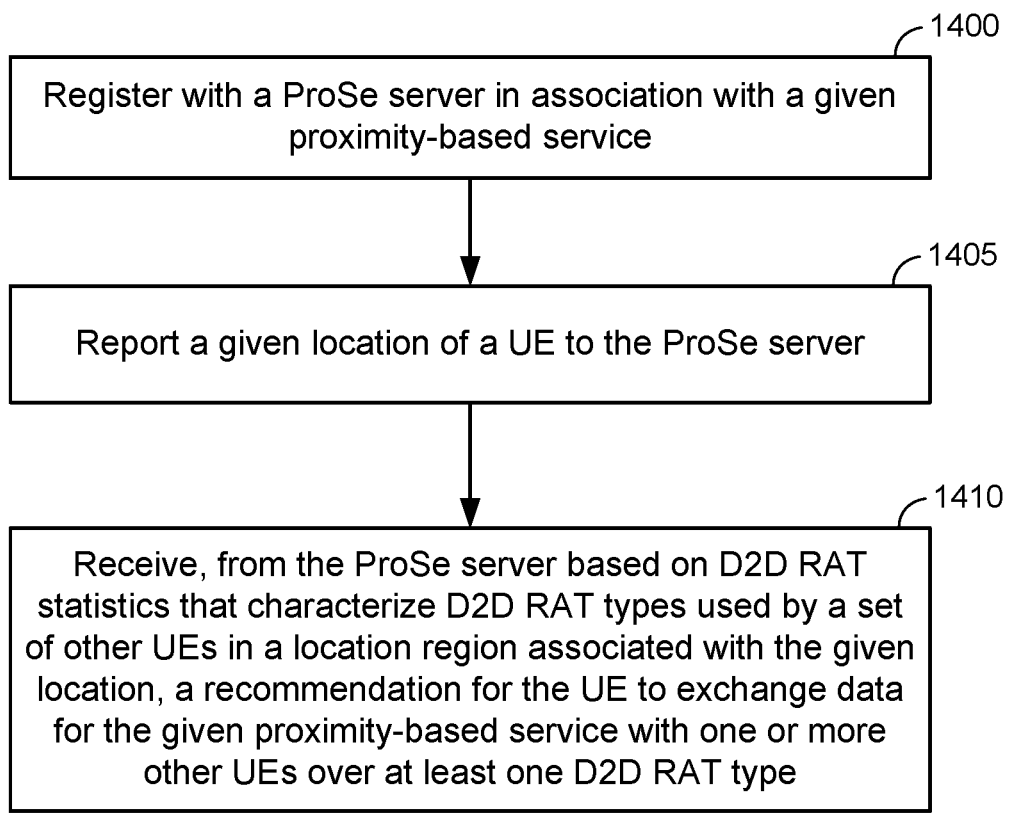
FIG. 14 illustrates an example implementation of the process of FIG. 8 or FIG. 11 in accordance with an embodiment of the disclosure.

FIG. 14 illustrates an example implementation of the process of FIG. 8 or FIG. 11 in accordance with an embodiment of the disclosure. In particular, the process of FIG. 14 relates to operation of a UE (e.g., the publisher in FIG. 8 or the subscriber in FIG. 11).

Referring to FIG. 14, at block 1400, a UE equipped with transmission and/or reception capability on multiple D2D RAT types registers with a ProSe server (e.g., application server 170 of FIG. 1, the communications device 300 of FIG. 3, the server 400 of FIG. 4, the ProSe server 516 of FIG. 5 or the ProSe server 686 of FIG. 6.) in association with a given proximity-based service. Block 1400 may correspond to block 800 of FIG. 8 or block 910 of FIG. 9 if the UE corresponds to a publisher of the given proximity-based service, or alternatively block 1400 may correspond to block 1100 of FIG. 11 or block 1210 of FIG. 12 if the UE corresponds to a publisher of the given proximity-based service.

Referring to FIG. 14, at block 1405, the UE reports its location to the ProSe server. Block 1405 may occur as part of the registration at block 1400 or alternatively may occur at a later point in time (e.g., via a location update notification after the UE moves to a different location, etc.). Block 1405 may correspond to block 800 of FIG. 8 or block 915 of FIG. 9 if the UE corresponds to a publisher of the given proximity-based service, or alternatively block 1405 may correspond to block 1100 of FIG. 11 or block 1215 of FIG. 12 if the UE corresponds to a publisher of the given proximity-based service.

Referring to FIG. 14, at block 1410, the UE receives, from the ProSe server based on D2D RAT statistics that characterize D2D RAT types used by a set of other UEs in a location region associated with the given location, a recommendation for the UE to exchange data for the given proximity-based service with one or more other UEs over at least one D2D RAT type. Block 1410 may correspond to block 815 of FIG. 8 or block 930 of FIG. 9 if the UE corresponds to a publisher of the given proximity-based service, or alternatively block 1405 may correspond to block 1115 of FIG. 11 or block 1230 of FIG. 12 if the UE corresponds to a publisher of the given proximity-based service.

While examples of the embodiments are primarily provided above with respect to the particular D2D RAT types of Bluetooth, LTE-D and Wi-Fi NAN, it will be appreciated that other embodiments may relate to any D2D RAT type (e.g., in terms of D2D RAT type capabilities of subscribers and/or publishers, in terms of recommended D2D RAT types, in terms of the D2D RAT sequence, and so forth). These other D2D RAT types include Wi-Fi Direct, Wi-Fi Aware, NFC and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method of operating a proximity services (ProSe) server, comprising:
   determining that a publisher at a given location is equipped with transmission capability on multiple device-to-device (D2D) radio access technology (RAT) types desires to offer a given proximity-based service;
   determining subscriber D2D RAT capability statistics that characterize D2D RAT type capabilities of a set of subscribers that subscribe to the given proximity-based service in a location region associated with the given location;
   selecting at least one D2D RAT type based at least in part on the subscriber D2D RAT capability statistics; and
   transmitting, to the publisher, a recommendation that the publisher advertise the given proximity-based service over the selected at least one D2D RAT type,
   wherein the subscriber D2D RAT capability statistics include current data related to one or more subscribers that are currently subscribed to the given proximity-based service while inside the location region,
   wherein the publisher is expected to offer the given proximity-based service for less than a threshold period of time, and
   wherein the selecting excludes historical data related to at least one subscriber that previously subscribed to the given proximity-based service while inside the location region as a selection factor based on the expectation.

2. The method of claim 1, wherein the multiple D2D RAT types include Long Term Evolution Direct (LTE-D), Wi-Fi Neighborhood Area Network (NAN), Wi-Fi Aware, Wi-Fi Direct, or Bluetooth.

3. The method of claim 1, wherein the selecting selects the at least one D2D RAT type that will permit the publisher to interface with a higher number or percentage of subscribers relative to at least one non-selected D2D RAT type from the multiple D2D RAT types supported by the publisher.

4. The method of claim 1, wherein the subscriber D2D RAT capability statistics characterize the D2D RAT type capabilities with respect to different portions of the location region for different D2D RAT types based on a communication range of each respective D2D RAT type.

5. The method of claim 4, wherein the multiple D2D RAT types includes a first D2D RAT type with a first communication range and a second D2D RAT type with a second communication range that is wider than the first communication range.

6. The method of claim 5,
   wherein at least one subscriber in the location region supports the first and second D2D RAT types,
   wherein, relative to the given location of the publisher, the at least one subscriber is outside of the first communication range and inside of the second communication range,
   wherein the at least one subscriber is factored into the subscriber D2D RAT capability statistics as not being capable of receiving on the first D2D RAT type despite supporting the first D2D RAT type based on the at least one subscriber being outside of the first communication range, and
   wherein the at least one subscriber is factored into the subscriber D2D RAT capability statistics as being capable of receiving on the second D2D RAT type based on the at least one subscriber supporting the second D2D RAT type while also being inside of the second communication range.

7. A method of operating a proximity services (ProSe) server, comprising:
   determining that a subscriber at a given location is equipped with reception capability on multiple device-to-device (D2D) radio access technology (RAT) types subscribes to a given proximity-based service;
   determining publisher D2D RAT capability statistics that characterize D2D RAT types used by a set of publishers to advertise the given proximity-based service in a location region associated with the given location;
   selecting at least one D2D RAT type based at least in part upon the publisher D2D RAT capability statistics; and
   transmitting, to the subscriber, a recommendation that the subscriber search for a publisher advertising the given proximity-based service over the selected at least one D2D RAT type,
   wherein the publisher D2D RAT capability statistics include current data related to one or more publishers that are currently advertising the given proximity-based service while inside the location region,
   wherein the set of publishers is expected to offer the given proximity-based service for less than a threshold period of time, and
   wherein the selecting excludes historical data related to at least one publisher that previously advertised the given proximity-based service while inside the location region as a selection factor based on the expectation.

8. The method of claim 7, wherein the multiple D2D RAT types include Long Term Evolution Direct (LTE-D), Wi-Fi Neighborhood Area Network (NAN), Wi-Fi Aware, Wi-Fi Direct, or Bluetooth.

9. The method of claim 7, wherein the selecting selects the at least one D2D RAT type that will permit the subscriber to interface with a higher number or percentage of subscribers relative to at least one non-selected D2D RAT type from the multiple D2D RAT types supported by the subscriber.

10. The method of claim 7, wherein the publisher D2D RAT capability statistics characterize the D2D RAT types with respect to different portions of the location region for different D2D RAT types based on a communication range of each respective D2D RAT type.

11. The method of claim 10, wherein the multiple D2D RAT types includes a first D2D RAT type with a first communication range and a second D2D RAT type with a second communication range that is wider than the first communication range.

12. The method of claim 11,
wherein at least one publisher in the location region supports the first and second D2D RAT types,
wherein, relative to the given location of the subscriber, the at least one publisher is outside of the first communication range and inside of the second communication range,
wherein the at least one publisher is not factored into the publisher D2D RAT capability statistics as not advertising the given proximity-based service on the first D2D RAT type based on the at least one publisher being outside of the first communication range, and
wherein the at least one publisher is factored into the publisher D2D RAT capability statistics as advertising the given proximity-based service on the second D2D RAT type based on the at least one publisher advertising the given proximity-based service on the second D2D RAT type while also being inside of the second communication range.

13. A method of operating a user equipment (UE) equipped with transmission and/or reception capability on multiple device-to-device (D2D) radio access technology (RAT) types, comprising:
registering, by the UE, with a proximity services (ProSe) server in association with a given proximity-based service;
reporting a given location of the UE to the ProSe server; and
receiving, from the ProSe server based on D2D RAT statistics that characterize D2D RAT types used or supported by a set of other UEs in a location region associated with the given location, a recommendation for the UE to exchange data for the given proximity-based service with one or more other UEs over at least one D2D RAT type,
wherein a set of publishers is expected to offer the given proximity-based service in the location region for less than a threshold period of time, and
wherein, based on the expectation, the recommendation is based on current data related to the set of other UEs without factoring historical data related to at least one subscriber to the given proximity-based service in the location region or at least one publisher of the given proximity-based service in the location region.

14. The method of claim 13,
wherein UE is a publisher that desires to offer the given proximity-based service,
wherein the set of other UEs correspond to a set of subscribers that subscribe to the given proximity-based service in the location region, and
wherein the recommendation recommends that the publisher advertise the given proximity-based service over the at least one D2D RAT type.

15. The method of claim 13,
wherein the UE is a subscriber that subscribes to the given proximity-based service,
wherein the set of other UEs correspond to a set of publishers that advertise the given proximity-based service in the location region, and
wherein the recommendation recommends that the subscriber search for a publisher advertising the given proximity-based service over the at least one D2D RAT type.

16. The method of claim 15, further comprising:
searching for the given proximity-based service over the at least one D2D RAT type in accordance with the recommendation.

17. The method of claim 16, further comprising:
selectively performing, based on whether the searching detects at least one publisher advertising the given proximity-based service, a supplemental search for the given proximity-based service over one or more different D2D RAT types.

18. The method of claim 15, further comprising:
searching for the given proximity-based service over at least one non-recommended D2D RAT type.

19. A method of operating a subscriber that subscribes to a given proximity-based service, comprising:
obtaining a binary code that is used by a set of publishers to identify the given proximity-based service on multiple device-to-device (D2D) radio access technology (RAT) types that are supported by the subscriber;
determining a D2D RAT sequence that defines at least a first set of D2D RAT types to be searched, the first set of D2D RAT types including less than all of the multiple D2D RAT types that are supported by the subscriber; and
searching for the binary code on the first set of D2D RAT types in accordance with the D2D RAT sequence.

20. The method of claim 19, wherein the D2D RAT sequence further defines at least one additional set of D2D RAT types to be conditionally searched after the first set of D2D RAT types are searched, further comprising:
selectively performing, based on whether the binary code is detected on the first set of D2D RAT types, a supplemental search for the binary code on the at least one additional set of D2D RAT types in accordance with the D2D RAT sequence.

21. The method of claim 19, wherein the D2D RAT sequence does not further define at least one additional set of D2D RAT types to be conditionally searched after the first set of D2D RAT types are searched, further comprising:
abandoning an attempt to discover the given proximity-based service after the searching irrespective of whether the binary code is detected based on the searching on the first set of D2D RAT types.

22. The method of claim 19, wherein the D2D RAT sequence is based in part upon a D2D RAT type recommendation from a proximity services (ProSe) server.

23. The method of claim 19, wherein the D2D RAT sequence is based upon one or more secondary factors that include one or more D2D RAT type preferences, a battery power level of the subscriber or a combination thereof.

* * * * *